US010731073B2

United States Patent
Do et al.

(10) Patent No.: US 10,731,073 B2
(45) Date of Patent: Aug. 4, 2020

(54) COMPOSITIONS FOR ENHANCED OIL RECOVERY

(71) Applicant: ECOLAB USA INC., St. Paul, MN (US)

(72) Inventors: Linh Do, Sugar Land, TX (US); Brian Mueller, Sugar Land, TX (US); Duy T. Nguyen, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 16/004,889

(22) Filed: Jun. 11, 2018

(65) Prior Publication Data

US 2018/0312745 A1 Nov. 1, 2018

Related U.S. Application Data

(62) Division of application No. 15/052,439, filed on Feb. 24, 2016, now abandoned.

(60) Provisional application No. 62/121,885, filed on Feb. 27, 2015, provisional application No. 62/169,890, filed on Jun. 2, 2015.

(51) Int. Cl.
| | |
|---|---|
| *E21B 43/26* | (2006.01) |
| *C09K 8/584* | (2006.01) |
| *C09K 8/86* | (2006.01) |
| *C09K 8/60* | (2006.01) |
| *C09K 8/68* | (2006.01) |
| *C09K 8/88* | (2006.01) |

(52) U.S. Cl.
CPC .............. *C09K 8/584* (2013.01); *C09K 8/602* (2013.01); *C09K 8/68* (2013.01); *C09K 8/86* (2013.01); *C09K 8/885* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 2,081,876 | A | 5/1937 | Prahl |
| 2,227,804 | A | 1/1941 | Britton et al. |
| 2,371,207 | A | 3/1945 | Zublin et al. |
| 2,990,375 | A | 6/1961 | Steinhauer et al. |
| 3,110,683 | A | 11/1963 | Steinhauer et al. |
| 3,171,797 | A | 3/1965 | Klingenmaier |

(Continued)

FOREIGN PATENT DOCUMENTS

| | | |
|---|---|---|
| CN | 101885963 A | 11/2010 |
| CN | 104650841 A | 5/2015 |

(Continued)

OTHER PUBLICATIONS

Extended European Search Report for European Application No. 16756239.6, dated Oct. 4, 2018, 16 pages.

(Continued)

*Primary Examiner* — Andrew Sue-Ako
(74) *Attorney, Agent, or Firm* — Kagan Binder, PLLC

(57) ABSTRACT

Disclosed herein are compositions and methods for increasing recovery of hydrocarbon compounds from hydrocarbon-containing subterranean fractured rock formations. Novel emulsions and fracturing fluids are provided. The fracturing fluids convert oil-wet rocks to water-wet, yet exhibit a low tendency of composition components to sorb to the rock. The fracturing fluids do not cause formation of emulsions with hydrocarbon compounds within the subterranean fractured rock formations.

7 Claims, 5 Drawing Sheets

(56) References Cited

U.S. PATENT DOCUMENTS

| | | |
|---|---|---|
| 3,457,107 A | 7/1969 | Mickelson et al. |
| 3,945,437 A | 3/1976 | Chiu et al. |
| 4,029,570 A | 6/1977 | Coffman et al. |
| 4,089,803 A | 5/1978 | Bessler |
| 4,276,933 A | 7/1981 | Kudchadker et al. |
| 4,532,051 A | 7/1985 | Nuckels nee Byth et al. |
| 4,739,831 A | 4/1988 | Settlemeyer et al. |
| 5,035,876 A | 7/1991 | Castellano |
| 5,060,727 A | 10/1991 | Schramm et al. |
| 5,110,487 A | 5/1992 | Current |
| 5,171,459 A | 12/1992 | Kaplan |
| 5,203,411 A | 4/1993 | Dawe et al. |
| 5,411,086 A | 5/1995 | Burcham et al. |
| 5,501,815 A | 3/1996 | Man |
| 5,710,121 A | 1/1998 | Tracy et al. |
| 5,759,409 A | 6/1998 | Knauf et al. |
| 5,851,429 A | 12/1998 | Magyar |
| 5,854,187 A | 12/1998 | Blum et al. |
| 5,922,671 A | 7/1999 | Tracy et al. |
| 6,022,403 A | 2/2000 | Kuo |
| 6,147,047 A | 11/2000 | Robbins et al. |
| 6,294,093 B1 | 9/2001 | Selvarajan et al. |
| 6,506,263 B1 | 1/2003 | Basaly et al. |
| 6,710,022 B1 | 3/2004 | Kwetkat et al. |
| 6,743,764 B1 | 6/2004 | Wallick et al. |
| 6,852,152 B2 | 2/2005 | Galasco et al. |
| 7,380,606 B2 | 6/2008 | Purlsey et al. |
| 7,566,744 B2 | 7/2009 | Newman et al. |
| 7,615,516 B2 | 11/2009 | Yang et al. |
| 7,655,603 B2 | 2/2010 | Crews |
| 7,886,824 B2 | 2/2011 | Kakadjian et al. |
| 7,893,010 B2 | 2/2011 | Ali et al. |
| 7,960,314 B2 | 6/2011 | Van Zanten et al. |
| 7,989,404 B2 | 8/2011 | Kakadjian et al. |
| 7,998,911 B1 | 8/2011 | Berger et al. |
| 8,091,646 B2 | 1/2012 | Quintero et al. |
| 8,746,341 B2 | 6/2014 | Nguyen et al. |
| 8,921,298 B2 | 12/2014 | Tyborski |
| 8,950,494 B2 | 2/2015 | Nguyen et al. |
| 8,961,807 B2 | 2/2015 | Fu et al. |
| 2003/0032683 A1 | 2/2003 | Spalding |
| 2003/0166472 A1 | 9/2003 | Pursley et al. |
| 2004/0266649 A1 | 12/2004 | Thekkekandam et al. |
| 2006/0019836 A1 | 1/2006 | Li et al. |
| 2006/0258541 A1 | 11/2006 | Crews |
| 2006/0260815 A1 | 11/2006 | Dahanayake et al. |
| 2007/0272277 A1 | 11/2007 | Jeffreys |
| 2007/0293404 A1 | 12/2007 | Hutchins et al. |
| 2008/0287324 A1 | 11/2008 | Pursley et al. |
| 2009/0006215 A1 | 1/2009 | Coker et al. |
| 2009/0020002 A1 | 1/2009 | Williams et al. |
| 2009/0062153 A1 | 3/2009 | Gray et al. |
| 2009/0149557 A1 | 6/2009 | Talingting-Pabalan et al. |
| 2009/0200027 A1 | 8/2009 | Kakadjian et al. |
| 2009/0281004 A1 | 11/2009 | Ali et al. |
| 2009/0325826 A1 | 12/2009 | Quintero et al. |
| 2010/0314118 A1 | 12/2010 | Quintero et al. |
| 2011/0021386 A1 | 1/2011 | Ali et al. |
| 2011/0021388 A1 | 1/2011 | Van Zanten et al. |
| 2011/0218126 A1 | 9/2011 | Berger et al. |
| 2011/0220353 A1 | 9/2011 | Bittner et al. |
| 2011/0247965 A1 | 10/2011 | Nguyen et al. |
| 2011/0281779 A1 | 11/2011 | Weerasooriya et al. |
| 2012/0021471 A1 | 1/2012 | Martin et al. |
| 2012/0088697 A1 | 4/2012 | Gatlin et al. |
| 2012/0125620 A1 | 5/2012 | Nguyen et al. |
| 2012/0184470 A1 | 7/2012 | Mao et al. |
| 2012/0214714 A1 | 8/2012 | Whitwell et al. |
| 2013/0026103 A1 | 1/2013 | Peterson et al. |
| 2013/0180723 A1 | 7/2013 | Crick et al. |
| 2013/0261033 A1 | 10/2013 | Nguyen |
| 2013/0261227 A1 | 10/2013 | Nguyen |
| 2013/0292121 A1 | 11/2013 | Penny et al. |
| 2013/0332130 A1 | 12/2013 | Loveless et al. |
| 2014/0166537 A1 | 6/2014 | Kremer et al. |
| 2015/0011453 A1 | 1/2015 | Bennett et al. |
| 2015/0038470 A1 | 2/2015 | Keasler et al. |
| 2015/0057196 A1 | 2/2015 | Debord et al. |
| 2015/0141303 A1 | 5/2015 | Harwell et al. |
| 2016/0251568 A1 | 9/2016 | Do et al. |

FOREIGN PATENT DOCUMENTS

| | | |
|---|---|---|
| EP | 1639989 A1 | 3/2006 |
| GB | 1396088 A | 5/1975 |
| KR | 20100107486 A | 10/2010 |
| WO | 1999052161 A1 | 10/1999 |
| WO | 99/58631 A1 | 11/1999 |
| WO | 2001000760 A1 | 1/2001 |
| WO | 2009/006251 A1 | 1/2009 |
| WO | 2009/127922 A2 | 10/2009 |
| WO | 2011106287 A1 | 9/2011 |
| WO | 2013148760 A1 | 10/2013 |
| WO | 2013158989 A1 | 10/2013 |
| WO | 2014/113445 A1 | 7/2014 |

OTHER PUBLICATIONS

International Search Report and Written Opinion dated Jun. 28, 2013 in connection with International Patent Application No. PCT/US2013/033994.

International Search Report and Written Opinion dated Jul. 26, 2013 in connection with International Patent Application No. PCT/US2013/037361.

Extended European Search Report dated Oct. 12, 2015 in connection with European Patent Application No. 13767501.3.

Patent Examination Report No. 1 dated Oct. 15, 2015 in connection with Australian Patent Application No. 2013239828.

Extended European Search Report dated Nov. 16, 2015 in connection with European Patent Application No. 13778640.6.

International Search Report and Written Opinion dated Jun. 6, 2016 in connection with International Patent Application No. PCT/US2016/019243.

Garlits, Don, "Kerosene works as rust inhibitor," Ocala Star-Banner, Friday, Jan. 17, 1992, 1 page.

"Clay Stabilization", Chapter 3: Petroleum Engineer's Guide to Oil Field Chemicals and Fluids, 2012 pp. 125-148, booksite.elsevier.com/samplechapters/9780123838445/9780123838445.pdf.

NALMET 1689 Technology for Soluble Metal Control, Product Data Sheet, Bulletin B-1210, 3 pages, 2012.

Galindo, T., et al. "Evaluation of Environmentally Acceptable Surfactants for Applicants as Flowback Aids", SPE International Symposium on Oilfield Chemistry, Apr. 1, 2013, pp. 1-12.

Razi, M., et al. "Effect of a Different Formulation of Demulsifiers on the Efficiency of Chemical Demulsification of Heavy Crude Oil", Journal of Chemical & Engineering Data, 56(9), Jun. 9, 2011, pp. 2936-2945.

Schramm, L.L., et al. "Surfactants and their applications", Annual Reports Section "C" Physical Chemistry, 99(1), Jan. 1, 2003, 46 pages.

Horsup et al. "Breakthrough Corrosion Inhibitor Technology for Heavily Fouled Systems", Corrosion, vol. 65, No. 8, pp. 527-544, Aug. 2009.

INEOS Oxide, Technical Data Sheet, Lauryl Alcohol Ethoxylates, 2004, 4 pages.

Calfax DBA-70, Diphenyl Oxide Disulfonate Anionic Surfactants, Retrieved from https://www.pilotchemical.com/products/calfax#calfax_dba70 on Sep. 5, 2019.

Dalfax DBA-70, Pilot Chemical—datasheet, Retrieved fromhttps://polymer-additives.specialchem.com/product/a-pilot-chemicals-calfax-dba-70 on Sep. 5, 2019.

Dow Chemical Taiwan Limited, Dowfax™ C10L Solution Surfactant, Safety Data Sheet, Issue Date Aug. 26, 2019, 12 pages.

Dow Chemical Company, Dowfax Anionic Surfactants for High-Performance Products, Published Jul. 2000, 20 pages.

Office Action in Russian Application No. 2017129837, dated Sep. 24, 2019, 6 pages (Official Copy Only—No English Translation Available).

(56) References Cited

OTHER PUBLICATIONS

Office Action from Russian Application No. BR 11 2017 017404 9, dated Feb. 10, 2020, 6 pages (4 pages Official Office Action and 2 pages English Translation).
Examination Report from Australian Application No. 2016222831, dated Apr. 7, 2020, 3 pages.

COMPOSITIONS FOR ENHANCED OIL RECOVERY

CROSS-REFERENCE TO RELATED APPLICATIONS

This application is a divisional application of U.S. patent application Ser. No. 15/052,439, which is incorporated by reference herein in the entirety and for all purposes. This application claims priority to U.S. Provisional Patent Application No. 62/121,885, filed Feb. 27, 2015, entitled "Compositions for Enhanced Oil Recovery," and U.S. Provisional Patent Application No. 62/169,890, filed Jun. 2, 2015, entitled "Compositions for Enhanced Oil Recovery," each of which is incorporated by reference herein, in the entirety and for all purposes.

FIELD OF THE INVENTION

The present invention relates to compositions and methods for increased recovery of crude oil from a subterranean hydrocarbon-containing formation.

BACKGROUND

Hydraulic fracturing is a well-stimulation technique in which subterranean rock is fractured by a hydraulically pressurized fracturing fluid typically made by combining water, an hydraulic fracturing proppant (conventionally sand or aluminum oxide), and additive chemicals that modify subterranean flow, subterranean interfacial tension, and/or provide other effects. A hydraulic fracture is formed by pumping the fracturing fluid into a wellbore at a rate sufficient to increase pressure at the target depth to exceed that of the fracture gradient (pressure gradient) of the rock. When the hydraulic pressure is removed from the well, the hydraulic fracturing proppants lodge within the cracks to hold the fractures open. Hydrocarbon compounds such as natural gas and petroleum are recovered via the cracks in the hydrocarbon-containing deep-rock formations. Hydraulic fracturing techniques can be used to form a new well and can also be used to extend the life of an existing conventional oil well.

Chemical additives including surfactants have been added to fracturing fluids in hydraulic fracturing processes to increase recovery of hydrocarbon compounds from subterranean hydrocarbon-containing formations. The surfactants can act to lower the interfacial tension between the fracturing fluid and the oil trapped within the fractures in the reservoir and can change the wettability of the reservoir rock, thereby increasing the yield of hydrocarbon compounds released from the rock fractures. However, many conventional surfactants and surfactant blends adsorb substantially onto the rock surfaces, depleting the surfactant quickly at the expense of deeper-lying fracture surfaces. Additionally, many injected surfactants facilitate underground emulsion formation between the hydrocarbon compounds and the fracturing fluid, which retards or prevents recovery of the hydrocarbon compounds.

Further, conventional chemical surfactants and mixtures thereof are often unstable or insoluble in the high temperature and/or high total dissolved solids water sources encountered in some subterranean reservoirs. For example, in some reservoirs temperatures in excess of 60° C. are encountered; temperatures can be as high as 250° C. Additionally, underground water is often characterized as having high total dissolved solids, such as about 4 wt % total dissolved solids and as much as about 35 wt % total dissolved solids. In some cases, a substantial portion of the dissolved solids are ionic (one or more salts).

Thus, there is a need in the industry for compositions that reduce the interfacial tension between a fracturing fluid and the oil trapped within the fractured subterranean rock formations without adsorbing strongly to the rock surfaces. There is a need in the industry for compositions that reduce the interfacial tension between a fracturing fluid and the oil trapped within the fractured subterranean rock formations in high temperature environments. There is a need in the industry for compositions that reduce the interfacial tension between a fracturing fluid and the oil trapped within fractured rock formations in subterranean environments having water sources that include high total dissolved solids. There is a need in the industry for compositions that increase the yield of hydrocarbon compounds recovered from fractured subterranean rock formations.

SUMMARY

Figure 1:
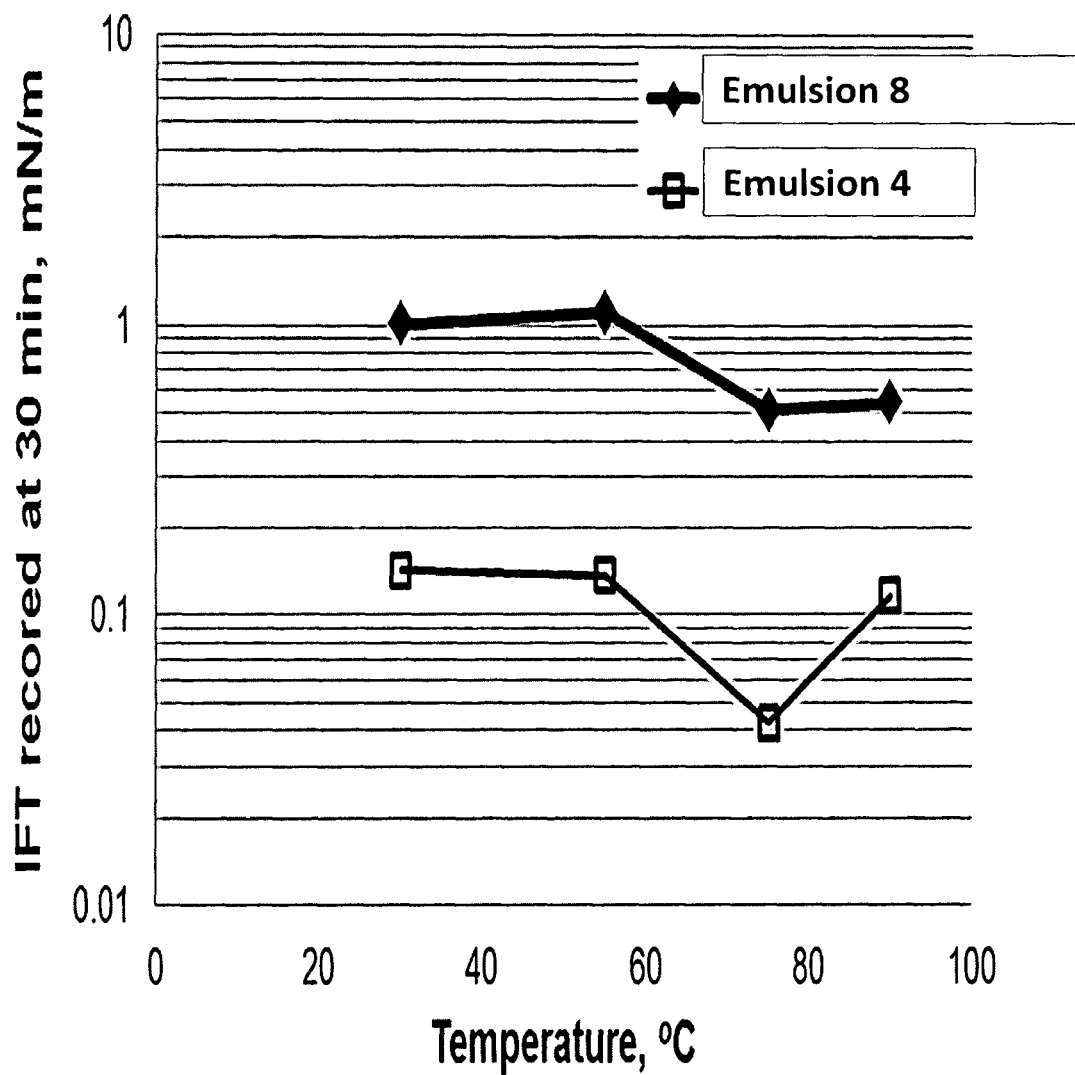
FIG. 1 is a plot of interfacial tension as a function of temperature for fracturing fluids of the invention.

Disclosed herein are compositions and methods for increased recovery of crude oil from a subterranean hydrocarbon-containing formation. Disclosed herein are emulsions that are useful to form fracturing fluids for injection into one or more subterranean reservoirs.

The emulsions of the invention are diluted with a high total dissolved water source, such as produced water, to form the fracturing fluids of the invention. The fracturing fluids of the invention are injected into oil-containing reservoirs. The fracturing fluids are thermally stable when subjected to underground conditions including temperatures of about 60° C. to 120° C. Upon injection, rock surfaces contacted by the fracturing fluids changes from oil-wettable to water-wettable. Yet the emulsion components of the fracturing fluids exhibit a low tendency to adsorb onto the rock. The fracturing fluids further substantially lower the interfacial energy between the fluid and the hydrocarbons present in the reservoir. Yet the fracturing fluids also inhibit formation of emulsions in underground fracturing fluid flows. The fracturing fluids exhibit improved sweeping efficiency and proppant clean-up performance under gravitational flow conditions when compared to conventional fracturing fluids. The fracturing fluids of the invention substantially increase the yield of hydrocarbon products such as crude oil or shale oil from underground reservoirs when injected therein. The fracturing fluids of the invention and are particularly useful for increasing the yield of hydrocarbon products in reservoirs where high temperatures are encountered underground.

Disclosed herein are compositions comprising about 98 wt % to 99.999 wt % of a water source comprising high total dissolved solids; one or more oil phase surfactants, the oil phase surfactants characterized as nonionic and having a combined HLB of less than about 9, one or more coupling agents, one or more water phase surfactants, wherein the water phase surfactants are nonionic, soluble or dispersible in water, and chemically different from the one or more oil phase surfactants, one or more ionic surfactants, a clay stabilizer, and water.

Also disclosed herein is a composition comprising about 98 wt % to 99.999 wt % of a water source comprising high total dissolved solids; one or more coupling agents; one or more water soluble or dispersible nonionic surfactants; one or more zwitterionic surfactants; one or more anionic surfactants, and optionally one or more additional ionic surfactants. In some embodiments, the emulsion is shelf stable. In some embodiments the composition is a fracturing fluid, the fracturing fluid comprising about 99 wt % to 99.999 wt % of a water source. In some embodiments the water source is a high temperature water source, a high total dissolved solids water source, or a high temperature, high total dissolved solids water source. In some embodiments, the compositions comprise one or more additives, the additives comprising one or more viscosifying agents, solvents, alkali, flow back aids, non-emulsifiers, friction reducers, breakers, crosslinking agents, biocides, proppants, or mixtures thereof.

Also disclosed herein is a method of increasing recovery of crude oil from a subterranean hydrocarbon-containing formation, the method comprising: forming an emulsion, the emulsion comprising one or more oil phase surfactants, the oil phase surfactants characterized as nonionic and having a combined HLB of less than about 9; a coupling agent; one or more water phase surfactants, wherein the water phase surfactants are nonionic, soluble or dispersible in water, and chemically different from the one or more oil phase surfactants; one or more ionic surfactants; one or more clay stabilizers, and about 40 wt % to 80 wt % water; contacting the emulsion with a water source to form a fracturing fluid; injecting the fracturing fluid into a subterranean hydrocarbon-containing formation; and collecting a hydrocarbon from the subterranean hydrocarbon-containing formation. In some embodiments, the injecting is into a first wellbore connected to the subterranean hydrocarbon-containing formation, and the collecting is from a second wellbore that is connected to the subterranean hydrocarbon-containing formation. In other embodiments, the injecting and the collecting are carried out in the same wellbore.

Also disclosed herein is a method of increasing recovery of crude oil from a subterranean hydrocarbon-containing formation, the method comprising: forming an emulsion, the emulsion comprising one or more coupling agents, one or more water soluble or dispersible nonionic surfactants, one or more zwitterionic surfactants, one or more anionic surfactants, and optionally one or more additional ionic surfactants; contacting the emulsion with a high total dissolved solids water source to form a fracturing fluid, the fracturing fluid comprising about 98 wt % to 99.99 wt % of the high total dissolved solids water source; injecting the fracturing fluid into a subterranean hydrocarbon-containing formation; and collecting a hydrocarbon from the subterranean hydrocarbon-containing formation. In some embodiments, the water source is contacted with the emulsion at a temperature of about 60° C. to 250° C. In some embodiments the contacting is carried out contemporaneously with the injecting; in other embodiments, the contacting is carried out prior to the injecting.

Other objects and features will be in part apparent and in part pointed out hereinafter.

DETAILED DESCRIPTION

Definitions

As used herein, the term "ionic surfactant" means a water soluble or water dispersible molecule having cationic, anionic, or zwitterionic functionality.

As used herein, the term "nonionic surfactant" means surfactant molecule characterized by the absence of cationic, anionic, or zwitterionic functionality.

As used herein, the term "emulsion" means a composition including at least water and a surfactant present in the water in an amount sufficient to surpass the critical micelle concentration (cmc). In some embodiments, an emulsion is a microemulsion. Microemulsions are characterized as emulsions that are transparent and thermodynamically stable.

As used herein, the term "water source" means a source of water comprising, consisting essentially of, or consisting of fresh water, tap water, well water, deionized water, distilled water, produced water, municipal water, waste water such as runoff water, "gray" water, or municipal waste water, treated or partially treated waste water, brackish water, or sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof. In some embodiments, a water source includes about 0 wt % to 35 wt % total dissolved solids. In some such embodiments, the total dissolved solids are substantially non-polymeric solids. In some such embodiments, the dissolved solids comprise, consist essentially of ionic compounds. The term "waterbased" or "water solution" generally refers to a composition including a water source. The term "saline" or "salinity" refers to a water source wherein a portion, in some embodiments a substantial portion, of the dissolved solids are salts. Generally and as determined by context, the term "water source" includes high total dissolved solids water sources, high temperature water sources, and high total dissolved solids, high temperature water sources.

As used herein, the term "high temperature" means about 60° C. to 120° C., as specified or determined by context.

As used herein, the term "high total dissolved solids" refers to a water source comprising at least about 4 wt % non-polymeric solids dissolved therein, and in embodiments up to about 35 wt % non-polymeric solids dissolved therein.

As used herein, the term "stable" as applied to an emulsion means a kinetically stable emulsion that absent any force applied, temperature change, or chemical added, is or is capable of being substantially free of coagulation, plating out, precipitation, gross coalescence of phases (conventionally referred to as "separation") or any other evidence of instability conventionally associated with emulsions for at least about 24 hours at about 20° C. Where the emulsion is a microemulsion, the emulsion is also thermodynamically stable. As used herein, the term "storage stable" as applied to an emulsion means that the emulsion is stable after at least six months of storage at temperatures between about −25° C. to 60° C.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Compositions of the First Embodiment

Disclosed herein are compositions for use in the recovery of hydrocarbon compounds from hydrocarbon-containing subterranean fractured rock formations. In a first embodiment, the compositions are emulsions. In some such embodiments, the emulsions are microemulsions. The emulsions comprise, consist essentially of, or consist of (1) one or more oil phase surfactants, the oil phase surfactants characterized as nonionic and having a combined HLB of less than about 9, (2) a coupling agent, (3) one or more water phase surfactants, wherein the water phase surfactants are nonionic, soluble or dispersible in water, and chemically different from the one or more oil phase surfactants, (4) one or more ionic surfactants, (5) one or more clay stabilizers, and (6) water.

Suitable oil phase surfactants usefully employed in the emulsions of the invention comprise, consist essentially of, or consist of one or more nonionic surfactants having an HLB of about 9 or less, or a combined HLB of about 9 or less.

Surfactants are often characterized by HLB. High HLB values indicate good water or polar solvent solubility of the surfactant while low HLB values are indicative of good solubility in non polar systems, such as oils. For nonionic surfactants, HLB is calculated using the Griffin formula:

$$HLB = 20 \times MWH/(MWH+MWL) = wt\% \text{ hydrophile}/5$$

where MWH=mol. wt. of hydrophile
MWL=mol. wt. of hydrophobe (lipophile)

Thus, for example, a C10 ethoxylated alcohol bonded to 8 ethylene oxide repeat units has an HLB of 13.83:

Hydrophobe: $CH_3(CH_2)_9$—OH; MW=158. Hydrophile: $[CH_2CH_2O]_8$; MW=352. Therefore $HLB = 20 \times 352/(352+158) = 13.83$.

Examples of suitable oil phase surfactants include alkoxylated alcohols, alkoxylated alkylphenols, glycerol esters, glycol esters, polyethylene glycol esters, polyglycerol esters, and sorbitol esters, and combinations of these. In embodiments, the alkoxylated alcohols include ethoxylated, propoxylated, and ethoxylated propoxylated alcohols wherein the alcohols include 6-20 carbons in linear, branched, or cyclic conformation and the alkoxy functionality includes an average of 1-6 moles of ethylene oxide, propylene oxide, or a combination thereof. Glycerol, glycol, polyethyleneglycol, polyglycerol, and sorbitol esters are formed from acids having 6-20 carbons in linear, branched, or cyclic conformation. Suitable oil phase surfactants have an HLB of less than about 9, for example about 2 to 9, or about 3 to 9, or about 4 to 9, or about 5 to 9, or about 6 to 9, or about 7 to 9, or about 2 to 8, or about 2 to 7, or about 2 to 6, or about 2 to 5, or about 2 to 4, or about 3 to 8, or about 4 to 8, or about 5 to 8, or about 6 to 8, or about 3 to 7, or about 4 to 7, or about 5 to 7. Mixtures of two or more such surfactants are also suitably employed in the emulsions of the invention. One of skill will understand that the HLB of such combinations is an average of the contribution of each surfactant in the mixture, wherein that the combined HLB of the mixture of oil phase surfactants is about 9 or less as indicated above.

The amount of oil phase surfactants present in the emulsions of the invention is about 0.1 wt % to about 35 wt % based on the total weight of an emulsion, for example about 0.5 wt % to 35 wt %, or about 1.0 wt % to 35 wt %, or about 1.5 wt % to 35 wt %, or about 2.0 wt % to 35 wt %, or about 5.0 wt % to 35 wt %, or about 10 wt % to 35 wt %, or about 0.1 wt % to 30 wt %, or about 0.1 wt % to 25 wt %, or about 0.1 wt % to 20 wt %, or about 1.0 wt % to 30 wt %, or about 1.5 wt % to 30 wt %, or about 2.0 wt % to 30 wt %, or about 2.0 wt % to 25 wt % based on the total weight of the emulsion.

Suitable coupling agents employed in the emulsions of the invention comprise, consist essentially of, or consist of water miscible solvents and mixtures of two or more water miscible solvents. The coupling agents do not destabilize the emulsions. In some embodiments, the coupling agents increase stability of the emulsions. In some embodiments, the coupling agent is fully miscible with water; that is, all possible coupling agent:water ratios are miscible. In other embodiments, the coupling agent is miscible with water at least up to about 20:1 water:coupling agent by volume, or about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10, about 1:20 water:coupling agent by volume, or ranges between any of these two ratios, such as between about 20:1 and 1:20, between 5:1 and 2:1, and the like.

Suitable coupling agents comprise, consist essentially of, or consist of linear, branched, or cyclic aliphatic alcohols having 1 to 6 carbon atoms, diols having 1 to 6 carbon atoms, alkyl ethers of alkylene glycols wherein the alkyl moiety has 1 to 6 carbon atoms (e.g., ethylene glycol mono-n-butyl ether) polyalkylene glycols, and mixtures thereof. Also useful as coupling agents are glycol and glycerol based acetals and ketals, such as those formed from the condensation of e.g. glycerol with formaldehyde, acetone, or oxocarboxylic acids, semialdehydes, and esters thereof such as levulinic acid or an alkyl levulinate. Examples of useful coupling agents include methanol, ethanol, glycerol, and ethylene glycol.

Suitable water phase surfactants employed in the emulsions of the invention comprise, consist essentially of, or consist of one or more nonionic surfactants that are soluble or dispersible in water and are chemically different from the one or more oil phase surfactants. In embodiments, the one or more nonionic surfactants are selected from the group consisting of alkoxylated alcohols and alkoxylated alkyl phenols having an HLB greater than about 10, for example about 10 to 20, or about 10 to 18, or about 10 to 16, or about 10 to 14, or about 11 to 20, or about 11 to 18, or about 11 to 17, or about 11 to 16, or about 11 to 15, or about 11 to 14, or about 11 to 13, and mixtures of these compounds.

Suitable water phase surfactants employed in the emulsions of the invention comprise, consist essentially of, or consist of one or more nonionic surfactants that are soluble or dispersible in water and are chemically different from the one or more oil phase surfactants. In embodiments, the water phase surfactant is one or more surfactants selected from the group comprising, consisting essentially of, or consisting of alkoxylated alcohols and alkoxylated alkyl phenols having an HLB greater than about 10, for example about 10 to 20, or about 10 to 18, or about 10 to 16, or about 10 to 14, or about 11 to 20, or about 11 to 18, or about 11 to 17, or about 11 to 16, or about 11 to 15, or about 11 to 14, or about 11 to 13, and mixtures of these compounds.

The amount of water phase surfactants employed in the emulsions of the invention totals about 0.1 wt % to to 10 wt % based on the total weight of an emulsion, or about 0.5 wt % to 10 wt %, or about 1.0 wt % to 10 wt %, or about 1.5 wt % to 10 wt %, or about 2.0 wt % to 10 wt %, or about 2.5 wt % to 10 wt %, or about 3.0 wt % to 10 wt %, or about 0.5 wt % to 9 wt %, or about 0.5 wt % to 8 wt %, or about 0.5 wt % to 7 wt %, or about 0.5 wt % to 6 wt %, or about 0.5 wt % to 5 wt %, or about 0.5 wt % to 4 wt %, or about 0.5 wt % to 3 wt %, or about 1.0 wt % to 5 wt %, or about 1.5 wt % to 5 wt %, or about 2 wt % to 5 wt %, or about 1 wt % to 4 wt %, or about 1.5 wt % to 4 wt %, or about 2 wt % to 4 wt % based on the total weight of the emulsion.

Suitable ionic surfactants employed in the emulsions of the invention comprise, consist essentially of, or consist of one or more amphoteric molecules having anionic, cationic or zwitterionic functionality and at least one linear, branched or cyclic hydrocarbon moiety having 6 to 20 carbons. Examples of suitable ionic surfactants include linear alkylbenzene sulfonic acid, alkyl benzene sulfonate, alkyl sulfonates, alkyl sulfates, alkyl ether sulfates, alkyl ammonium halides, alkyl aryl ammonium halides, imidazolium, cocoamidopropyl betaine, cocodimethyl betaine, and alkyl amine oxides.

The amount of ionic surfactants employed in the emulsions of the invention totals about 1 wt % to 20 wt % based on the total weight of an emulsion, for example about 1 wt % to 19 wt %, or about 1 wt % to 18 wt %, or about 1 wt % to 17 wt %, or about 1 wt % to 16 wt %, or about 1 wt % to 15 wt %, or about 1 wt % to 14 wt %, or about 1 wt % to 13 wt %, or about 1 wt % to 12 wt %, or about 1 wt % to 11 wt %, or about 1 wt % to 10 wt %, or about 2 wt % to 20 wt %, or about 3 wt % to 20 wt %, or about 4 wt % to 20 wt %, or about 5 wt % to 20 wt %, or about 6 wt % to 20 wt %, or about 7 wt % to 20 wt %, or about 8 wt % to 20 wt %, or about 9 wt % to 20 wt %, or about 10 wt % to 20 wt %, or about 2 wt % to 15 wt %, or about 5 wt % to 15 wt %, or about 7 wt % to 15 wt %, or about 7 wt % to 12 wt % based on the total weight of the emulsion.

Suitable clay stabilizers employed in the emulsions of the invention comprise, consist essentially of, or consist of quaternary ammonium salt polymers having molecular weights of about 500 g/mol to 10,000 g/mol, choline chloride, inorganic salts, and mixtures thereof. Inorganic salts usefully employed as clay stabilizers include KCl, CaCl$_2$, and MgCl$_2$. Additional clay stabilizers useful in the emulsions of the invention are listed in the Petroleum Engineer's Guide to Oil Field Chemicals and Fluids, 1$^{st}$ ed.; Johannes Fink: Chapter 3, "Clay Stabilization".

The amount of clay stabilizer employed in the emulsions of the invention totals about 1 wt % to 25 wt % based on the total weight of an emulsion, for example about 2 wt % to 25 wt %, or about 3 wt % to 25 wt %, or about 4 wt % to 25 wt %, or about 5 wt % to 25 wt %, or about 6 wt % to 25 wt %, or about 7 wt % to 25 wt %, or about 8 wt % to 25 wt %, or about 9 wt % to 25 wt %, or about 10 wt % to 25 wt %, or about 11 wt % to 25 wt %, or about 12 wt % to 25 wt %, or about 13 wt % to 25 wt %, or about 14 wt % to 25 wt %, or about 15 wt % to 25 wt %, or about 1 wt % to 24 wt %, or about 1 wt % to 23 wt %, or about 1 wt % to 22 wt %, or about 1 wt % to 21 wt %, or about 1 wt % to 20 wt %, or about 1 wt % to 19 wt %, or about 1 wt % to 18 wt %, or about 1 wt % to 17 wt %, or about 1 wt % to 16 wt %, or about 1 wt % to 15 wt %, or about 5 wt % to 20 wt %, or about 10 wt % to 20 wt % based on the total weight of the emulsion.

The water employed to form the emulsions of the invention is a water source. The water source comprises or consists essentially of water, wherein the water comprises 0 wt % to about 35 wt % total dissolved solids. In some embodiments, the water source is tap water. The amount of water source employed in the emulsions is about 30 wt % to 95 wt % of the total weight of an emulsion, for example about 35 wt % to 95 wt %, or about 40 wt % to 95 wt %, or about 45 wt % to 95 wt %, or about 50 wt % to 95 wt %, or about 55 wt % to 95 wt %, or about 60 wt % to 95 wt %, or about 30 wt % to 90 wt %, or about 30 wt % to 85 wt %, or about 30 wt % to 80 wt %, or about 30 wt % to 75 wt %, or about 30 wt % to 70 wt %, or about 30 wt % to 65 wt %, or about 30 wt % to 60 wt %, or about 40 wt % to 90 wt %, or about 40 wt % to 80 wt %, or about 50 wt % to 80 wt %, or about 50 wt % to 70 wt % based on the total weight of the emulsion.

Optionally, one or more nonionic oil soluble demulsifiers are added to improve efficiency of dilution of the emulsions during injection into the subterranean reservoir. Where present, the nonionic oil soluble demulsifiers are selected from the group comprising, consisting essentially of, or consisting of polyethylenimine alkoxylates, alkoxylated alkylphenol formaldehyde resins, alkoxylated amine-modified alkylphenol formaldehyde resins, ethylene oxide/propylene oxide copolymers, crosslinked ethylene oxide/propylene copolymers, and mixtures thereof. Where employed, the nonionic oil soluble demulsifiers are present in the emulsions at about 0.01 wt % to 5 wt % based on the total weight of an emulsion, for example about 0.05 wt % to 5 wt %, or about 0.1 wt % to 5 wt %, or about 0.2 wt % to 5 wt %, or about 0.3 wt % to 5 wt %, or about 0.4 wt % to 5 wt %, or about 0.5 wt % to 5 wt %, or about 0.6 wt % to 5 wt %, or about 0.7 wt % to 5 wt %, or about 0.8 wt % to 5 wt %, or about 0.9 wt % to 5 wt %, or about 1.0 wt % to 5 wt %, or about 0.01 wt % to 4.5 wt %, or about 0.01 wt % to 4.0 wt %, or about 0.01 wt % to 3.5 wt %, or about 0.01 wt % to 3.0 wt %, or about 0.01 wt % to 2.5 wt %, or about 0.01 wt % to 2.0 wt %, or about 0.01 wt % to 1.5 wt %, or about 0.01 wt % to 1.0 wt %, or about 0.5 wt % to 4 wt %, or about 0.5 wt % to 3 wt %, or about 0.5 wt % to 2 wt % based on the total weight of the emulsion.

In some embodiments, the emulsions include one or more oil field additives conventionally used in hydraulic fracturing or post-primary fracturing of subterranean hydrocarbon-containing formations. In some embodiments, the additives are added to the emulsions and the resulting additive containing emulsions are stable, or even shelf stable. In other embodiments, the additives are not added directly to the emulsions, but rather are added to the subterranean reservoir contemporaneously with dilution of the emulsions to form fracturing fluids. Suitable additives include viscosifying agents, solvents, alkali, flow back aids, non-emulsifiers, corrosion inhibitors, scale inhibitors, biocides, friction reducers, emulsion breakers, and proppants (e.g., sand or aluminum oxide particles). Suitable corrosion inhibitors include imidazoline and quaternary ammonium compounds and functionalized compounds and polymers. Suitable scale inhibitors include phosphonate compounds and acrylated polymers. In some embodiments, one or more such additives are added at an amount that is less than 1 percent by weight of the emulsion. In other embodiments, the additives added during dilution of an emulsion are employed at about 1 ppm to 500 ppm in the fracturing fluid formed during the dilution, for example about 2 ppm to 400 ppm, or about 3 ppm to 300 ppm, or about 4 ppm to 200 ppm, or about 5 ppm to 100 ppm of one or more additives.

The emulsions of the invention are stable. In some embodiments, the emulsions of the invention are shelf stable. In some such embodiments, the emulsions are shelf stable for about 6 months to two years, or about 6 months to one year. In some embodiments, the total concentration of surfactants in the emulsion, or a diluted emulsion, is referred to as the concentration of "actives" in a composition of the invention.

Compositions of the Second Embodiment

Disclosed herein are compositions for use in the recovery of hydrocarbon compounds from hydrocarbon-containing subterranean fractured rock formations. In a second embodiment, the compositions are emulsions. In some such embodiments, the emulsions are microemulsions. The emulsions of the second embodiment comprise, consist essentially of, or consist of (1) a coupling agent, (2) one or more water soluble or dispersible nonionic surfactants, (3) at least one zwitterionic surfactant, (4) at least one anionic surfactant, (5) optionally one or more additional ionic surfactants, and (6) water. In some embodiments, the total concentration of surfactants in a composition of the invention is referred to as the concentration of "actives".

The coupling agent employed in the compositions of the second embodiment comprises, consists essentially of, or consists of water miscible solvents and mixtures of two or more water miscible solvents. The coupling agents do not destabilize the emulsions. In some embodiments, the coupling agents increase stability of the emulsions. In some embodiments, the coupling agent is fully miscible with water; that is, all possible coupling agent:water ratios are miscible. In other embodiments, the coupling agent is miscible with water at least up to about 20:1 water:coupling agent by volume, or about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10, about 1:20 water:coupling agent by volume, or ranges between any of these two ratios, such as between about 20:1 and 1:20, between 5:1 and 2:1, and the like.

Suitable coupling agents comprise, consist essentially of, or consist of linear, branched, or cyclic aliphatic alcohols having 1 to 6 carbon atoms, diols having 1 to 6 carbon atoms, alkyl ethers of alkylene glycols wherein the alkyl moiety has 1 to 6 carbon atoms (e.g., ethylene glycol mono-n-butyl ether) polyalkylene glycols, and mixtures thereof. Also useful as coupling agents are glycol and glycerol based acetals and ketals, such as those formed from the condensation of e.g. glycerol with formaldehyde, acetone, or oxocarboxylic acids, semialdehydes, and esters thereof such as levulinic acid or an alkyl levulinate. Examples of useful coupling agents include methanol, ethanol, glycerol, and ethylene glycol.

The total amount of coupling agents included in the emulsions of the second embodiment is about 0.1 wt % to 20 wt % based on the total weight of an emulsion, for example about 0.5 wt % to 20 wt %, or about 1.0 wt % to 20 wt %, or about 2.0 wt % to 20 wt %, or about 3.0 wt % to 20 wt %, or about 4.0 wt % to 20 wt %, or about 5.0 wt % to 20 wt %, or about 6.0 wt % to 20 wt %, or about 7.0 wt % to 20 wt %, or about 8.0 wt % to 20 wt %, or about 9.0 wt % to 20 wt %, or about 10 wt % to 20 wt %, or about 0.1 wt % to 19 wt %, or about 0.1 wt % to 18 wt %, or about 0.1 wt % to 17 wt %, or about 0.1 wt % to 16 wt %, or about 0.1 wt % to 15 wt %, or about 0.1 wt % to 14 wt %, or about 0.1 wt % to 13 wt %, or about 0.1 wt % to 12 wt %, or about 0.1 wt % to 11 wt %, or about 0.1 wt % to 10 wt %, or about 5 wt % to 20 wt %, or about 5 wt % to 15 wt % based on the total weight of the emulsion.

The nonionic surfactant employed in the compositions of the second embodiment comprises, consists essentially of, or consists of one alkoxylated alcohols, alkoxylated alkylphenols, glycerol esters, glycol esters, polyethylene glycol esters, polyglycerol esters, and sorbitol esters, and combinations of these. In some embodiments, the nonionic surfactant is one or more surfactants selected from the group comprising, consisting essentially of, or consisting of alkoxylated alcohols and alkoxylated alkyl phenols having an HLB greater than about 10, for example about 10 to 20, or about 10 to 18, or about 10 to 16, or about 10 to 14, or about 11 to 20, or about 11 to 18, or about 11 to 17, or about 11 to 16, or about 11 to 15, or about 11 to 14, or about 11 to 13, and mixtures of these compounds. In embodiments, the alkoxylated alcohols include ethoxylated, propoxylated, and ethoxylated propoxylated alcohols wherein the alcohols include 4 to 10 carbons in linear, branched, or cyclic conformation and the alkoxy functionality includes an average of 4 to 12 moles of ethylene oxide, propylene oxide, or a combination thereof. In some embodiments, the nonionic surfactant is an alkoxylated C6 alcohol.

The amount of the nonionic surfactant employed in the emulsions of the second embodiment totals about 5 wt % to to 15 wt % based on the total weight of an emulsion, or about 6 wt % to 15 wt %, or about 7 wt % to 15 wt %, or about 8 wt % to 15 wt %, or about 9 wt % to 15 wt %, or about 5 wt % to 14 wt %, or about 5 wt % to 13 wt %, or about 5 wt % to 12 wt %, or about 5 wt % to 11 wt %, or about 5 wt % to 10 wt %, or about 6 wt % to 12 wt %, or about 7 wt % to 11 wt %, or about 8 wt % to 10 wt % based on the total weight of the emulsion of the second embodiment.

The zwitterionic surfactant employed in the compositions of the second embodiment comprises, consists essentially of, or consists of one or more amphoteric molecules including at least one linear, branched or cyclic hydrocarbon moiety having 6 to 20 carbons, or about 8 to 18 carbons, or about 10 to 16 carbons. Suitable zwitterionic surfactants include betaines, sultaines, and alkyl amine oxides. Examples of suitable zwitterionic surfactants include cocoamidopropyl betaine, cocodimethyl betaine, N,N-dimethyl hexadecaneamine N-oxide, cocodimethyl amine oxide, cocoamidopropyl hydroxysultaine, and dodecyl amino-hydroxypropyl sultaines such as lauryl hydroxysultaine (n-dodecyl(2-hydroxy-3-sulfonatopropyl)dimethylammonium).

The amount of zwitterionic surfactants employed in the emulsions of the second embodiment totals about 10 wt % to 20 wt % based on the total weight of an emulsion, for example about 10 wt % to 19 wt %, or about 10 wt % to 18 wt %, or about 10 wt % to 17 wt %, or about 10 wt % to 16 wt %, or about 11 wt % to 20 wt %, or about 12 wt % to 20 wt %, or about 13 wt % to 20 wt %, or about 14 wt % to 20 wt %, or about 15 wt % to 20 wt %, or about 16 wt % to 20 wt %, or about 12 wt % to 18 wt % based on the total weight of the emulsion.

The anionic surfactant employed in the emulsions of the second embodiment includes at least one anionic moiety and has an HLB of about 9 to 15, for example about 9 to 14, or about 9 to 13, or about 9 to 12, or about 9 to 11, or about 10 to 15, or about 11 to 15. Suitable anionic surfactants include sulfonated esters of alkyl, aralkyl, or aryl-functional carboxylic acids wherein the ester groups are derivatives of linear or branched alcohols having about 4 to 15 carbons. Suitable examples of anionic surfactants include di-n-octyl sodium sulfosuccinate ("DOSS" or "Aerosol OT"), sodium bis(2-ethylhexyl) sulfosuccinate, dicyclohexyl sodium sulfosuccinate, terminal ($\alpha$-) and internal olefin functional alkyl sulfonated surfactants, and alkylbenzene sulfonates.

The amount of the anionic surfactant employed in the emulsions of the second embodiment totals about 1 wt % to 10 wt % based on the total weight of an emulsion, for example about 1 wt % to 9 wt %, or about 1 wt % to 8 wt %, or about 1 wt % to 7 wt %, or about 1 wt % to 6 wt %, or about 1 wt % to 5 wt %, or about 2 wt % to 10 wt %, or about 3 wt % to 10 wt %, or about 2 wt % to 9 wt %, or about 2 wt % to 8 wt %, or about 2 wt % to 7 wt %, or about 2 wt % to 6 wt %, or about 2 wt % to 5 wt %, or about 2 wt % to 4 wt % based on the total weight of the emulsion.

The additional ionic surfactant optionally employed in the emulsions of the second embodiment comprises, consists essentially of, or consists of one or more molecules having anionic, cationic or zwitterionic functionality and at least one linear, branched or cyclic hydrocarbon moiety having 6 to 20 carbons, wherein the additional ionic surfactant is chemically different from the zwitterionic surfactant and the anionic surfactant included in the composition of the second embodiment. Examples of suitable ionic surfactants include linear alkylbenzene sulfonic acid, alkyl benzene sulfonate, alkyl sulfonates, alkyl sulfates, alkyl ether sulfates, alkyl ammonium halides, alkyl aryl ammonium halides, imidazolium, cocoamidopropyl betaine, cocodimethyl betaine, and alkyl amine oxides.

The amount of additional ionic surfactant employed in the emulsions of the second embodiment totals about 1 wt % to 20 wt % based on the total weight of an emulsion, for example about 1 wt % to 19 wt %, or about 1 wt % to 18 wt %, or about 1 wt % to 17 wt %, or about 1 wt % to 16 wt %, or about 1 wt % to 15 wt %, or about 1 wt % to 14 wt %, or about 1 wt % to 13 wt %, or about 1 wt % to 12 wt %, or about 1 wt % to 11 wt %, or about 1 wt % to 10 wt %, or about 2 wt % to 10 wt %, or about 3 wt % to 10 wt %, or about 4 wt % to 10 wt %, or about 5 wt % to 10 wt %, or about 6 wt % to 10 wt %, or about 7 wt % to 10 wt %, or about 8 wt % to 10 wt %, or about 10 wt % to 20 wt % based on the total weight of the emulsion.

In some embodiments, the emulsions of the second embodiment include one or more oil field additives conventionally used in hydraulic fracturing or post-primary fracturing of subterranean hydrocarbon-containing formations. In some embodiments, the additives are added to the emulsions and the resulting additive containing emulsions are stable, or even shelf stable. In other embodiments, the additives are not added directly to the emulsions, but rather are added to the subterranean reservoir contemporaneously with dilution of the emulsions. Suitable additives include viscosifying agents, solvents, alkali, flow back aids, non-emulsifiers, corrosion inhibitors, scale inhibitors, biocides, friction reducers, emulsion breakers, and proppants (e.g. sand or aluminum oxide particles) as listed above. In some embodiments, one or more such additives are added at an amount that is less than 1 percent by weight of the emulsion of the second embodiment. In other embodiments, the additives added during dilution of an emulsion of the second embodiment are employed at about 1 ppm to 500 ppm in the fracturing fluid formed during the dilution, for example about 2 ppm to 400 ppm, or about 3 ppm to 300 ppm, or about 4 ppm to 200 ppm, or about 5 ppm to 100 ppm of one or more additives.

The emulsions of the second embodiment are stable. In some embodiments, the emulsions of the second embodiment are shelf stable. In some such embodiments, the emulsions are shelf stable for about 6 months to two years, or about 6 months to one year.

Fracturing Fluids

The emulsions of the invention are diluted with a high total dissolved solids water source to form a fracturing fluid. The fracturing fluid is injected into a subterranean hydrocarbon containing fractured rock formation, or reservoir, where it results in increased recovery of hydrocarbon compounds from the subterranean hydrocarbon-containing formation. In some embodiments, the water source, the subterranean environment, or both are at a high temperature, that is about 60° C. or higher. In some embodiments, the emulsions of the first embodiment or the second embodiment are combined with a high total dissolved solids water source and any desired additives to produce a fracturing fluid of the invention contemporaneously with one or more injection processes. Such processes result in increased recovery of hydrocarbon compounds from reservoirs. In some embodiments the reservoirs are characterized by one or more of low permeability, low porosity, and high temperature. In some embodiments the water source used to dilute the emulsions of the invention to form fracturing fluids are characterized by high total dissolved solids, and in particular by a high concentration of divalent cations such as calcium and magnesium. In some embodiments the water source is produced water. In some embodiments, the water source is a combination of produced water and a second water source such as sea water, brackish water, fresh water, tap water, and the like. For example, in some embodiments, the water source is about 50% to 100% produced water.

In embodiments, the fracturing fluids of the invention comprise, consist essentially of, or consist of about 10 wt % or less of an emulsion of the first embodiment or the second embodiment, and about 90 wt % or more of a high total dissolved solids water source; optionally, the fracturing fluid further includes one or more of the additives as described above. The fracturing fluids are formed by combining the water source and the emulsion using conventional mixing procedures familiar to those of skill in the art of forming hydraulic fracturing fluids. No special methods or apparatuses are required to form the fracturing fluids of the invention from the emulsions of the first or second embodiments. In some embodiments, a fracturing fluid of the invention comprises, consists essentially of, or consists of a combination of an emulsion of the first embodiment or of the second embodiment, a high total dissolved solids water source, and optionally one or more additives. In some embodiments, the water source is produced water. In some embodiments, the produced water is high temperature.

In some embodiments, at the target (injectable) volume of produced water in the fracturing fluid is about 90% to 99.999% of the fracturing fluid volume, or about 91% to 99.999%, or about 92% to 99.999%, or about 93% to 99.999%, or about 94% to 99.999%, or about 95% to 99.999%, or about 96% to 99.999%, or about 97% to 99.999%, or about 98% to 99.999%, or about 99% to 99.999%, or about 90% to 99.99%, or about 90% to 99.9%, or about 90% to 99%, or about 90% to 98%, or about 92% to 99.9%, or about 94% to 99.9%, or about 95% to 99.9%, or about 98% to 99.9%, or about 99% to 99.9% of the fracturing fluid volume.

In embodiments, the water source employed to form the fracturing fluids of the invention is a high total dissolved solids water source, wherein the water source comprises about 4 wt % to 35 wt % substantially non-polymeric total dissolved solids. In some embodiments, the water source is a high temperature, high total dissolved solids water source. In some embodiments where the water source includes high total dissolved solids, a substantial portion of the total dissolved solids are ionic compounds. High total dissolved solids water sources include about 5 wt % to 35 wt %, or about 5 wt % to 32 wt %, or about 5 wt % to 30 wt %, or about 5 wt % to 28 wt %, or about 5 wt % to 26 wt %, or about 5 wt % to 24 wt %, or about 5 wt % to 22 wt %, or about 5 wt % to 20 wt %, or about 6 wt % to 35 wt %, or about 7 wt % to 35 wt %, or about 8 wt % to 35 wt %, or about 9 wt % to 35 wt %, or about 10 wt % to 35 wt %, or about 12 wt % to 35 wt %, or about 14 wt % to 35 wt %, or about 16 wt % to 35 wt %, or about 18 wt % to 35 wt %, or about 20 wt % to 35 wt %, or about 22 wt % to 35 wt %, or about 25 wt % to 35 wt %, or about 10 wt % to 32 wt %, or about 10 wt % to 30 wt %, or about 10 wt % to 28 wt %, or about 10 wt % to 26 wt %, or about 10 wt % to 24 wt %, or about 10 wt % to 22 wt %, or about 10 wt % to 20 wt % non-polymeric solids. In some embodiments, the water source is produced water, brackish water, or sea water.

"Produced water" is an industrial term of art meaning water that flows from a subterranean formation after release of pressure used to fracture the subterranean rock. In some embodiments, the produced water is contacted with an emulsion of the invention to dilute the emulsion, and eliminate the emulsion itself (forming a single phase composition) prior to or during subterranean injection. In some embodiments produced water contains high levels of divalent ions and other ions that cause instabilities when conventional emulsions are blended therewith. Substantial amounts of ions such as Cl, Na, Ca, Mg, Sr, Ba, or Fe are known to cause instabilities in conventional fracturing fluids, that is, fracturing fluids formed from produced water and conventional emulsions.

In some embodiments, the water source contacting the emulsion, such as sea water, brackish water, produced water, or combinations thereof with one or more additional water sources includes 300 ppm or more of one or more ions. In some embodiments, the water source contacting the emulsion contains one more of the following: about 300 ppm or more of Ca, for example 500 ppm or more or even 3000 ppm or more of Ca; about 1100 ppm or more of Mg; about 300 ppm or more of Ba, for example about 500 ppm or more of Ba; or about 85000 ppm Cl or more. It is an unexpected advantage of the present invention that stable fracturing fluids are formed from the emulsions of the invention by blending the emulsions with water sources containing 300 ppm or more of any one or more ions, such as Cl, Na, Ca, Mg, Sr, Ba, or Fe.

The fracturing fluids of the invention are stable in the presence of any one or more of the following: about 300 ppm to 20,000 ppm Ca, or about 500 ppm to 20,000 ppm Ca, or about 1000 ppm to 20,000 ppm Ca, or about 2000 ppm to 20,000 ppm Ca, or about 3000 ppm to 20,000 ppm Ca, or about 4000 ppm to 20,000 ppm Ca, or about 5000 ppm to 20,000 ppm Ca, or about 6000 ppm to 20,000 ppm Ca, or about 7000 ppm to 20,000 ppm Ca, or about 8000 ppm to 20,000 ppm Ca, or about 9000 ppm to 20,000 ppm Ca, or about 10,000 ppm to 20,000 ppm Ca; about 300 ppm to 4000 ppm Mg, or about 400 ppm to 4000 ppm Mg, or about 500 ppm to 4000 ppm Mg, or about 600 ppm to 4000 ppm Mg, or about 700 ppm to 4000 ppm Mg, or about 800 ppm to 4000 ppm Mg, or about 900 ppm to 4000 ppm Mg, or about 1000 ppm to 4000 ppm Mg, or about 1500 ppm to 4000 ppm Mg, or about 2000 ppm to 4000 ppm Mg; about 300 ppm to 3000 ppm Ba, or about 500 ppm to 3000 ppm, or about 600 ppm to 3000 ppm, or about 700 ppm to 3000 ppm, or about 800 ppm to 3000 ppm, or about 900 ppm to 3000 ppm, or about 1000 ppm to 3000 ppm, or about 1200 ppm to 3000 ppm, or about 1400 ppm to 3000 ppm, or about 1600 ppm to 3000 ppm, or about 1800 ppm to 3000 ppm, or about 2000 ppm to 3000 ppm Ba; about 300 ppm to 2500 ppm Sr, or about 400 ppm to 2300 ppm, or about 500 ppm to 2300 ppm, or about 600 ppm to 2300 ppm, or about 700 ppm to 2300 ppm, or about 800 ppm to 2300 ppm, or about 900 ppm to 2300 ppm, or about 1000 ppm to 2300 ppm, or about 1200 ppm to 2300 ppm, or about 1400 ppm to 2300 ppm, or about 1600 ppm to 2300 ppm, or about 1800 ppm to 2300 ppm Sr; about 5000 ppm to 100,000 ppm Na, or about 10,000 ppm to 100,000 ppm, or about 20,000 ppm to 100,000 ppm, or about 30,000 ppm to 100,000 ppm, or about 40,000 ppm to 100,000 ppm, or about 50,000 ppm to 100,000 ppm, or about 60,000 ppm to 100,000 ppm, or about 70,000 ppm to 100,000 ppm, or about 80,000 ppm to 100,000 ppm Na; about 100 ppm to 3000 ppm Fe, or about 200 ppm to 3000 ppm, or about 300 ppm to 3000 ppm, or about 400 ppm to 3000 ppm, or about 600 ppm to 3000 ppm, or about 800 ppm to 3000 ppm, or about 1000 ppm to 3000 ppm Fe; or about 5000 ppm to 200,000 ppm Cl, or about 10,000 ppm to 200,000 ppm, or about 20,000 ppm to 200,000 ppm, or about 40,000 ppm to 200,000 ppm, or about 60,000 ppm to 200,000 ppm, or about 80,000 ppm to 200,000 ppm, or about 100,000 ppm to 200,000 ppm, or about 110,000 ppm to 200,000 ppm, or about 120,000 ppm to 200,000 ppm, or about 130,000 ppm to 200,000 ppm, or about 140,000 ppm to 200,000 ppm, or about 150,000 ppm to 200,000 ppm, or about 160,000 ppm to 200,000 ppm, or about 170,000 ppm to 200,000 ppm, or about 180,000 ppm to 200,000 ppm Cl.

In some embodiments, the water source contacting the emulsions of the invention is a high total dissolved solids water source wherein the total amount of ions is at least about 4 wt % (40,000 ppm) and as much as about 35 wt % (350,000 ppm); in such embodiments, the fracturing fluids of the invention are stable in the presence of high total dissolved solids water sources. The fracturing fluids of the invention are stable not only in the presence of ions in individual amounts greater than 300 ppm, and in the presence of about 4 wt % to 35 wt % total dissolved solids, but further wherein the fracturing fluid is formed, injected, or otherwise employed at about 10° C. to 60° C., or about 20° C. to 60° C., or about 30° C. to 60° C., or about 40° C. to 60° C., or about 50° C. to 60° C., or at high temperature, that is about 60° C. to 120° C., or about 70° C. to 120° C., or about 80° C., to 120° C., or about 90° C. to 120° C.

An analysis of produced water from various locations of subterranean reservoirs reveals that the concentrations of ionic species varies widely across different geographic locations where subterranean reservoirs are located. A sampling of some ionic species from different produced waters is listed in Table 1. A produced water can have one or more of the following: more than about 24,000 ppm Na content, more than about 2500 Ca content, more than about 70,000 Cl content, more than about 100 ppm Ba content, more than about 50 ppm Fe content, more than about 500 ppm Mg content, and more than about 1500 ppm carbonate (carbonic acid equivalent) content.

TABLE 1

Concentrations of various ionic species in produced waters. Notably, "TOTAL" means all dissolved solids, including but not limited to the listed species. Blank = species not measured.

| | Concentration, ppm in various produced water | | | | |
|---|---|---|---|---|---|
| Species | Marcellus Shale | Bakken | Wolfcamp (sample 1) | Wolfcamp (sample 2) | Permian Basin |
| Al | <20 | | | | |
| Ba | 2900 | | | | |
| Ca | 11000 | 13177 | 3660 | 5657 | 2993 |
| Cl | | 184500 | 71600 | 84610 | 71596 |
| Cr | <5 | | | | |
| Co | 49 | | | | |
| Cu | <5 | | | | |
| Fe | <75 | | | | |
| $HCO_3$ | | | 278 | 49 | |
| Mg | 940 | 1175 | 1350 | 2224 | 598 |
| Mn | <5 | | | | |
| Mo | <130 | | | | |
| Ni | <30 | | | | |
| K | 190 | 5643 | | | |
| $SO_4$ | | | 2350 | 1892 | 2028 |
| $SiO_2$ | <50 | | | | |
| Na | 24000 | 85322 | 40900 | 45060 | 42785 |
| Sr | 2300 | | | | |
| Ti | <75 | | | | |
| V | <10 | | | | |
| Zn | <20 | | | | |
| TOTAL | 110000 | 289817 | 120138 | 139492 | 120000 |

From an inspection of Table 1, it is clear that a fracturing fluid can be made using produced water to dilute an emulsion prior to injection only if the emulsion produces a stable diluted fluid in the presence of a range of dissolved ionic species as well as concentrations of those species.

Additional challenges of employing produced water include substantial compositional variability (see Table 1), variation in regulations governing the storage, treatment, and disposal of produced water, and availability of produced water at the source—that is, fresh water or other low total dissolved solids water sources are often not readily available in the field, or are in short supply and cannot be used to dilute the produced water. Shipping water to the field is not a practical solution due to cost. Thus, it is beneficial to hydraulic fracturing operations to enable the use of the substantially variable high total dissolved water sources available in the field.

We have found that the emulsions of the first embodiment and the second embodiment are usefully employed to dilute with high total dissolved solids water, such as produced water, to form stable fracturing fluids. The fracturing fluids of the invention do not exhibit cloudiness, precipitation, phase separation, gelation, or any other behavior attributable to instability. The fracturing fluids are thermally stable when subjected to underground conditions including temperatures of about 60° C. to 120° C. Thus, the fracturing fluids made using produced water are suitable for injection into a subterranean reservoir, where the fluids remain stable and do not cause precipitation, phase separation, or another behavior attributable to instability, while flowing underground. This in turn results in optimal recovery of hydrocarbons from the reservoir. The fracturing fluids of the invention are particularly useful for increasing the yield of hydrocarbon products from reservoirs where high temperatures are encountered underground since no instabilities are encountered due to high temperature.

Methods

In embodiments, a method of the invention comprises, consists essentially of, or consists of diluting the emulsions of the first embodiment or the second embodiment with a high total dissolved solids water source to form a fracturing fluid, injecting the fracturing fluid into a well which is in contact with a subterranean hydrocarbon-containing formation, and collecting one or more hydrocarbon compounds from the well. The fracturing fluid contains an amount of the emulsion of the invention that is effective for lowering the interfacial tension between fracturing fluid and the hydrocarbon compounds trapped within the formation. The fracturing fluid contains an amount of the emulsion of the invention that is effective for changing the wettability of the subterranean hydrocarbon-containing formation to recover hydrocarbon compounds from the subterranean hydrocarbon-containing formation.

In embodiments, the injecting includes injecting into an underground reservoir wherein high temperatures are encountered. In some such embodiments, the fracturing fluid becomes a high temperature fracturing fluid. Stated differently, the water source present in the fracturing fluid becomes a high temperature water source in addition to being a high total dissolved solids water source. We have found that the properties desirably associated with the fracturing fluids of the invention, as described herein, are maintained or are superior to those imparted by conventional fracturing fluids when subjected to high temperature environments. In some embodiments, the underground temperatures encountered by the injected fracturing fluids of the invention is about 60° C. to 120° C., for example about 60° C. to 115° C., or about 60° C. to 110° C., or about 60° C. to 105° C., or about 60° C. to 100° C., or about 60° C. to 95° C., or about 60° C. to 90° C., or or about 70° C. to 120° C., or about 75° C. to 120° C., or about 80° C. to 120° C., or about 85° C. to 120° C., or about 90° C. to 120° C. The fracturing fluids of the invention are stable at these high temperatures. When subjected to high temperature conditions, the fracturing fluids of the invention maintain superior properties for producing low interfacial tension with hydrocarbon compounds, low adsorption onto rock surfaces, production of water-wettable rock surfaces, and improved sweeping efficiency and proppant clean-up performance under conventional flow conditions when compared to conventional fracturing fluids.

The methods of the invention optionally include adding one or more additives to the emulsion or to the fracturing fluid prior to or contemporaneously with formation of and/or injection of the fracturing fluid into a subterranean reservoir. Suitable additives include viscosifying agents, solvents, alkali, flow back aids, non-emulsifiers, corrosion inhibitors, scale inhibitors, biocides, friction reducers, emulsion breakers, and proppants (e.g., sand or aluminum oxide particles). Suitable corrosion inhibitors include imidazoline and quaternary ammonium compounds and functionalized compounds and polymers. Suitable scale inhibitors include phosphonate compounds and acrylated polymers. In some embodiments, the additives added during dilution of an emulsion to form a fracturing fluid. Generally, the additives are employed at about 1 ppm to 500 ppm in the fracturing fluid, for example about 2 ppm to 400 ppm, or about 3 ppm to 300 ppm, or about 4 ppm to 200 ppm, or about 5 ppm to 100 ppm of one or more additives.

Upon injection of the fracturing fluids of the invention into a subterranean reservoir, rock surfaces contacted by the fracturing fluids changes from oil-wettable to water-wettable. Yet the emulsion components of the fracturing fluids exhibit a low tendency to adsorb onto the rock.

The methods of the invention further include collecting one or more hydrocarbon compounds from the underground reservoir after injection of the fracturing fluid of the invention into the reservoir. The fracturing fluids of the invention are effective to change the wettability of subterranean rock, coated or even saturated with hydrocarbon compounds, from oil-wet to water-wet, or from mixed-wet to water-wet. Wettability of the subterranean rock is critical for obtaining maximum yield of hydrocarbon, which can otherwise stay adhered to the surface of rock in the form of a film. The large amount of subterranean rock surface area makes the surface energy, that is, the wettability of the rock with oil vs. aqueous compositions, critical.

Wettability is determined by measuring contact angle of a fracturing fluid on oil-saturated rock. In some embodiments, the fracturing fluids of the invention result in a contact angle of less than 90° when contacted with rock previously soaked in hydrocarbon compounds such as crude oil products. In some embodiments, after about 1 second of contact with rock previously soaked in hydrocarbon compounds, contact angle of a fracturing fluid of the invention is observed to be 70° or less, such as about 5° to 70°, or about 10° to 70°, or about 20° to 70°, or about 30° to 70°, or about 40° to 70°, or about 5° to 65°, or about 5° to 60°, or about 5° to 55°, or about 5° to 50°, or about 5° to 45°, or about 10° to 60°, or about 10° to 50°, or about 20° to 50°, or about 30° to 50°. In some embodiments, after about 10 seconds of contact with rock previously soaked in hydrocarbon compounds, contact angle of a fracturing fluid of the invention is observed to be 50° or less, such as about 5° to 50°, or about 10° to 50°, or about 20° to 50°, or about 30° to 50°, or about 5° to 45°, or about 5° to 40°, or about 5° to 35°, or about 10° to 35°, or about 10° to 30°, or about 20° to 40°, or about 25° to 40°. In some embodiments, after about 60 second of contact with rock previously soaked in hydrocarbon compounds, contact angle of a fracturing fluid of the invention is observed to be 40° or less, such as about 5° to 40°, or about 7° to 40°, or about 10° to 40°, or about 15° to 40°, or about 20° to 40°, or about 5° to 35°, or about 5° to 30°, or about 5" to 25%, or about 5° to 20°, or about 7° to 30°, or about 7° to 25°, or about 10° to 25°.

Additionally, the emulsions of the invention exhibit low critical micelle concentration (cmc) when diluted with a water source. The emulsions of the invention, that is the combined emulsion components along with any additives employed—exhibit cmc of about 1 ppm to 50 ppm, or about 1 ppm to 40 ppm, or about 1 ppm to 30 ppm, or about 1 ppm to 20 ppm, or about 1 ppm to 10 ppm, or about 2 ppm to 10 ppm in high temperature, high total dissolved solids water sources, wherein measured cmc values vary as a function of type and amount of solids dissolved in the water source and temperature of the water. Without wishing to be bound by theory, we believe that a lower cmc leads to less free surfactant concentration—particularly when the emulsions of the invention are diluted to form fracturing fluids—and less free surfactant in the fracturing fluids leads to less adsorption onto rock surfaces.

We have further found that the fracturing fluids of the invention lead to reduced interfacial tension between the fracturing fluid and the hydrocarbon compounds present in the hydrocarbon containing subterranean rock formation. For example, a fracturing fluid of the invention reduces interfacial tension between a hydrocarbon compound mixture and a high temperature high total dissolved solids water source an order of magnitude or more compared to the interfacial tension of a mixture of the hydrocarbon compound mixture and the high temperature, high total dissolved solids water source without the fracturing fluid of the invention.

In embodiments, the interfacial energy of a mixture of a hydrocarbon and a fracturing fluid of the invention is about 0.2 mN/m to 0.005 mN/m, or about 0.15 mN/m to 0.005 mN/m, or about 0.12 mN/m to 0.005 mN/m, or about 0.1 mN/m to 0.005 mN/m, or about 0.09 mN/m to 0.005 mN/m, or about 0.08 mN/m to 0.005 mN/m, or about 0.07 mN/m to 0.005 mN/m, or about 0.06 mN/m to 0.005 mN/m, or about 0.05 mN/m to 0.005 mN/m, or about 0.04 mN/m to 0.005 mN/m, or about 0.03 mN/m to 0.005 mN/m, or about 0.02 mN/m to 0.005 mN/m, or about 0.2 mN/m to 0.007 mN/m, or about 0.2 mN/m to 0.009 mN/m, or about 0.2 mN/m to 0.01 mN/m, or about 0.2 mN/m to 0.015 mN/m, or about 0.2 mN/m to 0.02 mN/m, or about 0.1 mN/m to 0.01 mN/m at ambient temperatures, e.g. about 20° C. At temperatures between about 50° C. and 100° C., the the interfacial energy of a mixture of a hydrocarbon and a fracturing fluid of the invention stays within the stated ranges. It is an unexpected advantage of the fracturing fluids of the invention that very low interfacial energy of a mixture of a hydrocarbon and a fracturing fluid of the invention is maintained even at elevated temperatures. At such temperatures, the fracturing fluid also contains high total dissolved solids. Yet the fracturing fluids are stable under such conditions and provide enhanced performance as a result of these properties.

In a first example of enhanced performance, the interfacial energy of a mixture of a hydrocarbon and a fracturing fluid of the invention remains substantially constant in high total dissolved solids water sources over a range of water source composition. This is so even when the water source includes a substantial amount of divalent cations such as calcium, magnesium, barium, and the like. This effect is beneficial for providing predictable performance of the fracturing fluids over a range of conditions encountered in the field. Thus, in embodiments, the interfacial energy of a mixture of a hydrocarbon and a fracturing fluid of the invention varies about ±0.08 mN/m or less over a range of water sources having between 0 and 35 wt % total dissolved non-polymeric solids, for example about ±0.08 mN/m to ±0.01 mN/m, or about ±0.07 mN/m to ±0.01 mN/m, or about ±0.06 mN/m to ±0.01 mN/m, or about ±0.05 mN/m to ±0.01 mN/m, or about ±0.04 mN/m to ±0.01 mN/m, or about ±0.03 mN/m to ±0.01 mN/m, or about ±0.02 mN/m to ±0.01 mN/m, or about ±0.08 mN/m to ±0.02 mN/m, or about ±0.08 mN/m to ±0.03 mN/m, or about ±0.08 mN/m to ±0.04 mN/m, or about ±0.06 mN/m to ±0.01 mN/m, or about ±0.06 mN/m to ±0.02 mN/m, or about ±0.05 mN/m to ±0.01 mN/m, or about ±0.05 mN/m to ±0.02 mN/m, or about ±0.04 mN/m to ±0.01 mN/m, or about ±0.04 mN/m to ±0.02 mN/m over a range of water sources having between 0 and 35 wt % total dissolved non-polymeric solids.

In a second example of enhanced performance, the interfacial energy of a mixture of a hydrocarbon and a fracturing fluid of the invention remains substantially constant in high total dissolved solids water sources over a range of temperatures. This is so even when the water source includes a substantial amount of divalent cations such as calcium, magnesium, barium, and the like. This effect is beneficial for providing predictable performance of the fracturing fluids over a range of conditions encountered in the field. Thus, in embodiments, the interfacial energy of a mixture of a hydrocarbon and a fracturing fluid of the invention varies about ±0.08 mN/m or less when measured in water sources having between 0 and 35 wt % total dissolved non-polymeric solids and further wherein the temperature of the fracturing fluid ranges from about 20° C. to 120° C., for example about ±0.08 mN/m to ±0.01 mN/m, or about ±0.07 mN/m to ±0.01 mN/m, or about ±0.06 mN/m to ±0.01 mN/m, or about ±0.05 mN/m to ±0.01 mN/m, or about ±0.04 mN/m to ±0.01 mN/m, or about ±0.03 mN/m to ±0.01 mN/m, or about ±0.02 mN/m to ±0.01 mN/m, or about ±0.08 mN/m to ±0.02 mN/m, or about ±0.08 mN/m to ±0.03 mN/m, or about ±0.08 mN/m to ±0.04 mN/m, or about ±0.06 mN/m to ±0.01 mN/m, or about ±0.06 mN/m to ±0.02 mN/m, or about ±0.05 mN/m to ±0.01 mN/m, or about ±0.05 mN/m to ±0.02 mN/m, or about ±0.04 mN/m to ±0.01 mN/m, or about ±0.04 mN/m to ±0.02 mN/m when measured in water sources having between 0 and 35 wt % total dissolved non-polymeric solids and further wherein the temperature of the fracturing fluid ranges from about 20° C. to 120° C.°

In a third example of enhanced performance, despite being effective to lower the interfacial tension between a hydrocarbon compound mixture and a high total dissolved solids water source, the fracturing fluids of the invention do not induce formation of emulsions with hydrocarbon compounds when injected into subterranean reservoirs. As a measure of this property, we have found that where equal parts of a fracturing fluid of the invention is thoroughly mixed with a hydrocarbon compound or mixture thereof using a high shear mixing apparatus designed to form emulsions, the mixture separates rapidly once shear is stopped. In some embodiments, such mixtures separate completely within about 1 minute to 5 minutes, or about 1 minute to 4 minutes, or about 1 minute to 3 minutes, or about 2 minutes to 5 minutes, or about 2 minutes to 4 minutes.

Further, the fracturing fluids exhibit improved sweeping efficiency and proppant clean-up performance under gravitational flow conditions when compared to conventional fracturing fluids. Thus, the fracturing fluids of the invention substantially increase the yield of hydrocarbon compounds and mixture thereof, such as crude oil or shale oil, from underground reservoirs when injected therein when compared to conventional compositions. Water saturation of sand type proppants, for example, is reduced by employing the fracturing fluids. In embodiments, saturation of proppant silica sand after treatment with the fracturing fluids of the invention followed by gravity assisted draining is less than about 70 wt % fracturing fluid based on the weight of the sand, for example about 70 wt % to 20 wt %, or about 70 wt % to 25 wt %, or about 70 wt % to 30 wt %, or about 70 wt % to 35 wt %, or about 70 wt % to 40 wt %, or about 70 wt % to 45 wt %, or about 70 wt % to 50 wt %, or about 65 wt % to 20 wt %, or about 60 wt % to 20 wt %, or about 55 wt % to 20 wt %, or about 50 wt % to 20 wt %, or about 45 wt % to 20 wt %, or about 40 wt % to 20 wt %, or about 35 wt % to 20 wt %, or about 30 wt % to 20 wt %, or about 50 wt % to 30 wt %, or about 40 wt % to 30 wt %. The average flow rate of hydrocarbons recovered from the reservoir after treating with a fracturing fluid of the invention is increased at least ten-fold, or 10×, compared to the average flow rate obtained by conventional surfactants; in embodiments the average flow rate is increased 10× to 50×, or 20× to 50×, or 30× to 50×, or even 40× to 50× compared to flow rate obtained by conventional surfactants. In oil breakthrough testing as described in the Examples below, oil flow rates as high as about 0.1 mL/min to 1 mL/min are obtained using the fracturing fluids of the invention, or about 0.2 mL/min to 1 mL/min, or about 0.3 mL/min to 1 mL/min, or about 0.4 mL/min to 1 mL/min, or about 0.5 mL/min to 1 mL/min, or about 0.1 mL/min to 0.9 mL/min, or about 0.1 mL/min to 0.8 mL/min, or about 0.1 mL/min to 0.7 mL/min, or about 0.1 mL/min to 0.6 mL/min, or about 0.1 mL/min to 0.5 mL/min are obtained using the fracturing fluids of the invention.

In some embodiments, the subterranean hydrocarbon-containing formation addressed by the emulsions and fracturing fluids of the invention is a sandstone reservoir or a carbonate reservoir. In some embodiments, the injection is carried out after hydraulic fracturing of the well. In other embodiments, the injection is carried out during hydraulic fracturing of the well. The methods of the invention are particularly useful when the reservoir has low permeability, low porosity, oil-wet wettability, high temperature, and/or high salinity, and/or when there is a high concentration of divalent cations in the fracturing fluid and/or produced water.

The emulsions of the invention are also suitably employed in one or more steam assisted gravity drainage (SAGD) processes. SAGD is an enhanced oil recovery technology for producing heavy crude oil and bitumen. It is an advanced form of steam stimulation in which a pair of parallel horizontal wells are drilled into a subterranean reservoir, one a few meters above the other. High pressure steam is continuously injected into the upper wellbore to heat the oil and reduce its viscosity, causing the heated oil to drain into the lower wellbore, where it is pumped out. In such processes, the emulsions or fracturing fluids of the invention are usefully injected along with the steam to affect wettability, surface tension, and the like.

Having described the invention in detail, it will be apparent that modifications and variations are possible without departing from the scope of the invention defined in the appended claims.

EXPERIMENTAL

The following non-limiting examples are provided to further illustrate the present invention.

Example 1

The following components were blended to form Emulsion 1:

| | |
|---|---|
| Nonylphenol ethoxylates (HLB of about 13) | 2.4 wt % |
| Castor oil ethoxylate (HLB of about 11.5) | 0.8 wt % |
| Methanol | 10.8 wt % |
| Cocoamidopropyl betaine | 9.6 wt % |
| Water | 58.8 wt % |
| Choline chloride | 15.0 wt % |
| C12-14 alcohol ethoxylate (HLB of about 8) | 0.2 wt % |
| Ethylene oxide/propylene oxide copolymer | 0.8 wt % |
| Polyethylene imine ethoxylate | 1.0 wt % |

Emulsion 1 was observed to be stable. Emulsion 1 was further observed to be a microemulsion. Emulsion 1 was observed to be stable at 115° C.

The solubility of surfactant-containing compositions in brines was determined to reduce the possibility of damage to a reservoir in subsequent field testing. This screening test ensures that no solid precipitates when the composition comes into contact with a formation fluid or fracturing fluid.

Surfactant-containing compositions were prepared by adding the compositions to Bakken produced water (27% total dissolved solids) to form aqueous mixtures having 0.2% concentration of actives. The mixtures were monitored for stability at 115° C. and were observed for precipitation and suspension formation. A mixture that remains visibly clear is considered to have sufficient aqueous stability. The results are reported in Table 2.

TABLE 2

Surfactant stability in Bakken produced water at 115° C.

| Product Type | Observed Stability Results |
|---|---|
| C12 alcohol ethoxylate having an average of 14 EO | Separated |
| Nonylphenol ethoxylate having more than 12 EO | Separated |
| Ethylene oxide/propylene oxide copolymer having an average number of 14 repeat units | Separated |
| C14-C16 olefin sulfonate | Separated |
| Dicocodimethyl ammonium chloride | Separated |
| Emulsion 1 | Clear |
| Lignin (obtained from MeadWestvaco of Richmond, VA) | Separated |
| C12-C14 phosphate ester | Separated |
| Castor oil ethoxylate having 20-40 EO | Separated |
| C12-C14 alcohol ether sulfonate | Separated |

Example 2

A composition was formed according to Example 1. Then 120 ppm of a quaternized imidazoline surfactant (corrosion inhibitor), 150 ppm of a a phosphonate (scale inhibitor), and 120 ppm glutaraldehyde (biocide) was added to the composition to yield a shelf stable microemulsion, referred to as Emulsion 2.

Example 3

Bakken reservoir rock core plugs were weighed, saturated with Bakken oil (a hydrocarbon compound mixture) and stored for at least 4 days at ambient pressure to achieve oil wet status. Then excess oil was wiped from the plugs, and the plugs were reweighed; the density of the oil was determined in order to calculate the volume of oil taken up by the rock cores. The cores were then placed with all faces opened in glass imbibition cells having precision graduations in 0.1 mL. For each of the following tests, two rock core plugs were tested.

An aliquot of Emulsion 1 was diluted to 0.1 wt % solids (that is, a total of 0.1 wt % of all surfactants combined) with a 4 wt % brine solution to form Fracturing Fluid 1. The imbibition cells were filled with a volume of the diluted Emulsion 1, then placed in a heated bath set at a temperature of 115° C. Displaced oil from the plugs formed a layer on top of the diluted Emulsion 1 in the cells, quantifiable as displaced volume. The cells were allowed to remain in the heated bath for up to 500 hours or until displacement of oil, measured by the volume graduations of the imbibition cells, was observed to stop. The volume of oil measured was used to calculate the % Original Oil in Place (OOIP) oil recovery, which is the percent of oil volume measured in the test as a percent of the volume of oil taken up by the rock cores prior to initiation of the test. Table 3 shows the oil recovery results as volume of oil displaced.

The experiment was repeated with Emulsion 2, diluted to 0.1% solids in 4% brine to form Fracturing Fluid 2. A comparative experiment was run using 4% brine alone. Then the experiment was repeated using 0.1 wt % of various surfactants dissolved in 4% brine. The sulfobetaine is lauryl sulfobetaine, which is described in International Publication WO 2014/088817. The alcohol ether sulfonate is oleyl alcohol ether sulfonate, as described in U.S. Pat. No. 7,629,299. Results are shown in Table 3.

TABLE 3

% Original Oil in Place (OOIP) for the listed materials at 115° C. (blank = not tested.)

| | % OOIP | | | | |
|---|---|---|---|---|---|
| Time, hr | Sulfo-betaine, 0.1 wt % | Alcohol ether sulfonate, 0.1 wt % | Fracturing Fluid 1 | Fracturing Fluid 2 | 4% brine |
| 0 | 0 | 0 | 0 | 0 | 0 |
| 0.5 | | | 0.49 | 17.98 | 0 |
| 1 | | | 1.96 | 22.48 | 0 |
| 2 | | | | 22.48 | 2.07 |
| 3 | | | 29.44 | 22.48 | 2.07 |
| 4 | | | | 22.48 | 2.07 |
| 5 | | | 29.44 | 22.48 | 2.07 |
| 6 | | | | 22.48 | 2.07 |
| 7 | | | | 22.48 | 2.07 |
| 8 | | | 34.35 | 31.47 | 2.07 |
| 24 | 9.8 | 20.35 | 39.25 | 31.47 | 2.07 |
| 48 | 9.8 | 20.35 | 39.25 | 33.72 | 2.07 |
| 72 | 15.68 | 20.35 | | 38.21 | 2.07 |
| 96 | 19.6 | 20.35 | 39.25 | 38.21 | 2.07 |
| 120 | 19.6 | 20.35 | 39.25 | 38.21 | 2.07 |
| 144 | 21.56 | 20.35 | 39.25 | 40.46 | 2.07 |
| 168 | 21.56 | 20.35 | 39.25 | 42.71 | 2.07 |
| 192 | 21.56 | 20.35 | 39.25 | 42.71 | 2.07 |
| 216 | 21.56 | 20.35 | | 42.71 | 2.07 |
| 240 | 21.56 | 20.35 | | 42.71 | 2.07 |
| 264 | 21.56 | 20.35 | | 42.71 | 2.07 |
| 288 | 21.56 | 20.35 | | 42.71 | 2.07 |
| 312 | 21.56 | 20.35 | | 42.71 | 2.07 |

Example 4

The procedure of Example 3 was repeated with Emulsion 2, except that Emulsion 2 was diluted to 0.01 wt % solids with 4% brine to form Fracturing Fluid 3. Results of oil displacement are shown in Table 4.

TABLE 4

% OOIP for Fracturing Fluid 3 at 115° C.

| Time, hr | % OOIP |
| --- | --- |
| 0 | 0 |
| 0.5 | 19.01 |
| 1 | 34.23 |
| 2 | 34.23 |
| 3 | 38.03 |
| 4 | 38.03 |
| 5 | 38.03 |
| 6 | 38.03 |
| 7 | |
| 8 | |
| 24 | 41.83 |
| 48 | 41.83 |
| 72 | 41.83 |

Example 5

Bakken cores were saturated with the Bakken oil at 900 psi (6205 kPa), 115° C. for 7 days or longer, then the surface oil was wiped off. A drop of a test material was placed on the core and the contact angle was measured as a function of time after drop placement using a goniometer. A comparative experiment was run with 4% brine alone. Additionally, the sulfobetaine and alcohol ether sulfonate employed in Example 2 were added at 0.1 wt % in 4% brine and contact angle measurements carried out with these surfactants solutions. All measurements were made at 25° C. Results are shown in Table 5.

TABLE 5

Contact angle at 25° C. as a function of time for the indicated materials deposited on the surface of Bakken cores saturated with Bakken oil.

| | Contact angle, ° | | | | | | | |
| --- | --- | --- | --- | --- | --- | --- | --- | --- |
| Material tested | 0.1 sec | 1 sec | 3 sec | 10 sec | 60 sec | 80 sec | 120 sec | 150 sec |
| 4% brine | 121.6 | 120.2 | 111.3 | 101.4 | 91.6 | 87.7 | 85.7 | 85.6 |
| Fracturing Fluid 1 | 47.0 | 44.0 | 39.2 | 32.6 | 17.7 | 13.0 | 7.1 | 4.6 |
| Alcohol ether sulfonate | 80.2 | 78.5 | 75.4 | 67.2 | 45.9 | 42.4 | 37.6 | 33.2 |
| Sulfobetaine | 75.0 | 73.3 | 69.6 | 60.8 | 43.8 | 41.4 | 38.5 | 36.4 |

Example 6

Critical micelle concentration at 80° C. was determined for Emulsion 1 by measuring the surface tension as a function of surfactant concentration at 80° C. using a Krüss Tensiomer K-100 (obtained from Krüss GmbH of Hamburg, Germany). As a comparative example, the sulfobetaine employed in Example 2 was also measured. Table 6 shows the results of critical micelle concentration (cmc) measurements.

TABLE 6

Critical Micelle Concentration at 80° C.

| Product | cmc, ppm |
| --- | --- |
| Emulsion 1 actives in tap water | 8-18 |
| Emulsion 1 actives in 22% brine | 2-5 |
| Emulsion 1 actives in 4% brine | 6-10 |
| Sulfobetaine, in tap water | 400-900 |

Example 7

This test was performed to compare the ability of various materials to prevent emulsion formation when contacted with residual oil. Various materials were added to 25 ml of 4% KCl having pH adjusted to 11. Twenty five (25) ml of 4% KCl containing a test material was mixed with twenty five (25) ml of oil obtained from Bakken and blended at 14,000 rpm in a Waring Blender at 90° C. for 1 minute. The mixture was then poured into a 6-oz glass prescription bottle to observe the water breakout from the emulsion. Table 6 shows the results of the observations, wherein 100% breakout indicates complete separation of the liquids. The sulfobetaine and the alcohol ether sulfonate are the same materials as employed in Example 2.

An emulsion was formed that was the same as Emulsion 1, except that no C12-14 alcohol ethoxylate was included. The emulsion is Emulsion 3. Emulsion 3 was tested according to the above procedure and the results are reported in Table 7.

TABLE 7

Emulsion 3 breakout at 90° C.

| Material added to brine | Gallons of Material per 1000 gallons of brine, based on active | % Breakout | | |
| --- | --- | --- | --- | --- |
| | | 1 min | 2 min | 3 min |
| None | 0 | 44 | 93 | 93 |
| Emulsion 1 | 1 | 85 | 96 | 100 |
| Alcohol ether sulfonate | 1 | 1 | 2 | 2 |
| Sulfobetaine | 1 | 50 | 60 | 67 |
| Emulsion 3 | 1 | 33 | 50 | 67 |

Example 8

Emulsion 1 was diluted to various concentrations in 4% brine and 22% brine against Bakken oil at 80° C. Interfacial tension (IFT) was measured for the diluted Emulsion 1 using a spinning drop tensiometer. Table 8 shows the interfacial tension (IFT) of Emulsion 1 as a function of the concentration of Emulsion 1 actives.

TABLE 8

IFT of Emulsion 1 actives against Bakken oil at 80° C.

| Emulsion 1 in 4% brine, ppm actives | IFT, mN/m | Emulsion 1 in 22% brine, ppm actives | IFT, mN/m |
| --- | --- | --- | --- |
| 0 | 14.23 | 0 | 22.16 |
| 1 | 12.51 | 1 | 16.09 |
| 5 | 5.53 | 5 | 10.95 |
| 10 | 4.52 | 10 | 8.28 |
| 20 | 3.17 | 20 | 2.18 |

TABLE 8-continued

IFT of Emulsion 1 actives against Bakken oil at 80° C.

| Emulsion 1 in 4% brine, ppm actives | IFT, mN/m | Emulsion 1 in 22% brine, ppm actives | IFT, mN/m |
|---|---|---|---|
| 30 | 1.53 | 30 | 1.93 |
| 50 | 0.75 | 50 | 1.10 |
| 100 | 0.71 | 100 | 1.00 |
| 300 | 1.31 | 300 | 1.72 |
| 1000 | 1.54 | 1000 | 1.45 |

Example 9

The components shown in Table 9 were blended to form Emulsions 4-10, Cl (control), and C2 (control). The blended components formed microemulsions at ambient temperature.

TABLE 9

Components of Emulsions 4-9, C1, and C2.

| Component | Component Type | Manufacturer, if applicable | Amount, wt % |
|---|---|---|---|
| Emulsion 4 | | | |
| Tap water | water | | 61.5 |
| Methanol | coupling agent | | 16.3 |
| BIO-SOFT ® N91-8 (ethoxylated alcohol [C9-C11-8 EO]) | nonionic | Stepan Company of Northfield, IL | 5.4 |
| BIO-SOFT ® N1-5 (ethoxylated alcohol [C11-5 EO]) | nonionic | Stepan | 5.4 |
| TORNADOL ®1-7 | nonionic | Air Products and Chemicals, Inc. of Allentown, PA | 2.7 |
| ARQUAD ® 2C-75 | cationic | Akzo Nobel N.V. of Amsterdam, the Netherlands | 8.6 |
| Emulsion 5 | | | |
| PETROSTEP ® SB | zwitterionic | Stepan Company | 15.9 |
| Ethoxylated alcohol [C6, 15 EO] | nonionic | Huntsman Corporation of The Woodlands, TX | 9.5 |
| AEROSOL OT-70 PG | anionic | Cytec Industries, Inc. of West Paterson, NJ | 3.1 |
| Glycerol | coupling agent | | 6.4 |
| Tap water | water | | 65.0 |
| Emulsion 6 | | | |
| PETROSTEP ® SB | zwitterionic | Stepan | 11.1 |
| Ethoxylated alcohol [C6, 15 EO] | nonionic | Huntsman | 11.1 |
| AEROSOL ® OT-70 PG | anionic | Cytec | 4.5 |
| Glycerol | coupling agent | | 4.5 |
| Tap water | water | | 68.8 |
| Emulsion 7 | | | |
| PETROSTEP ® SB | zwitterionic | Stepan | 15.9 |
| Ethoxylated alcohol [C6, 15 EO] | nonionic | Huntsman | 9.6 |
| AEROSOL OT-70 PG | anionic | Cytec | 1.6 |
| AEROSOL MA-80 | anionic | Cytec | 1.4 |
| Glycerol | coupling agent | | 3.2 |
| Methanol | coupling agent | | 3.2 |
| Tap water | water | | 65.1 |

TABLE 9-continued

Components of Emulsions 4-9, C1, and C2.

| Component | Component Type | Manufacturer, if applicable | Amount, wt % |
|---|---|---|---|
| Emulsion 8 | | | |
| SERDOX ® [C11-9 EO] | nonionic | Elementis Specialties, Inc., East Windsor, NJ | 24.0 |
| ARQUAD ® 2C-75 | cationic | Akzo Nobel | 1.4 |
| Methyl tris(2-hydroxyethyl) ammonium chloride | cationic | | 10.5 |
| Tap water | water | | 64.2 |
| Emulsion 9 | | | |
| PETROSTEP ® SB | zwitterionic | Stepan | 21.4 |
| Ethoxylated alcohol [C6, 15 EO] | nonionic | Huntsman | 4.0 |
| AEROSOL ® OT-70 PG | anionic | Cytec | 4.3 |
| Methanol | coupling agent | | 10.0 |
| Tap water | water | | 60.4 |
| Emulsion 10 | | | |
| MACKAM ® LSB-50 | zwitterionic | Solvay Novecare | 20 |
| Ethoxylated alcohol [C6-15 EO] | nonionic | Huntsman | 4 |
| AEROSOL OT-70 PG | anionic | Cytec Industries, Inc. | 5 |
| Methanol | coupling agent | | 10 |
| Tap water | water | | 61 |
| Emulsion C1 | | | |
| Ethoxylated alcohol [C11-9 EO] | nonionic | | 12.0 |
| Dicoco dimethyl ammonium chloride | cationic | | 0.7 |
| Tap water | water | | 87.3 |
| Emulsion C2 | | | |
| Ethoxylated alcohol [C11-9 EO] | nonionic | | 24.0 |
| Dicoco dimethyl ammonium chloride | cationic | | 1.4 |
| Choline chloride | cationic | | 10.0 |
| Tap water | water | | 64.6 |

Example 10

Stability of fracturing fluids formed from emulsions C1, C2, 4, 5, and 7 was measured by diluting the emulsions with brine and observing the fracturing fluids at selected temperatures. Thus, fracturing fluids were formed by diluting the emulsions to a total of 0.2 wt % of emulsion "actives" (components other than water) with either a 2 wt % total dissolved solids (TDS) water source (synthetic Eagle Ford brine) or a 30 wt % TDS water source (synthetic Bakken brine). The fracturing fluids were held at 20° C., 55° C., 65° C., 75° C., or 90° C. for two weeks and the appearance of the fluid was assessed. Results are shown in Table 10. "Unstable" for purposes of this experiment means any visible sign of phase separation or precipitation.

TABLE 10

Stability test results for fracturing fluids (0.2 wt % solids) formed from emulsions C1, C2, 4, 5, and 7 in brine.

| Emulsion No. | Brine, wt % TDS | Temperature, ° C. | | | | |
|---|---|---|---|---|---|---|
| | | 20 | 55 | 65 | 75 | 90 |
| C1 | 2 | S | U | U | U | U |
| C1 | 30 | S | U | U | U | U |
| C2 | 2 | S | S | S | S | S |
| C2 | 30 | S | S | U | U | U |
| 4 | 2 | S | S | S | S | S |
| 4 | 30 | S | U | U | U | U |
| 5 | 2 | S | S | S | S | S |
| 5 | 30 | S | S | S | S | S |
| 7 | 2 | S | S | S | S | S |
| 7 | 30 | S | S | S | S | S |

S = stable; U = unstable.

Example 11

Interfacial tension experiments were carried out on fracturing fluids formed from Emulsions 5 and C1 using an M6500 spinning drop tensiometer (obtained from Grace Instrument Company of Houston, Tex.). Fracturing fluid samples were prepared by diluting the emulsion with a brine solution at 1:1000 vol/vol emulsion:brine. The brine included 110,000 ppm total dissolved solids (11 wt % TDS). Tensiometer readings were recorded every 5 minutes over a 30 minute test period to evaluate the interaction of the tested fracturing fluid with crude oil, condensate or model alkane oil at projected reservoir temperatures. The interfacial tension of the fracturing fluid derived from Emulsion C2 with Eagle Ford condensate was found to be 1.007 mN/m at ambient temperature; the interfacial tension of the fracturing fluid derived from Emulsion 5 with Eagle Ford condensate was 0.012 mN/m at ambient temperature.

The test was repeated for Emulsions 4 and 8, wherein temperature was varied from 30° C. to 90° C. during the test. A plot of interfacial tension after 30 min equilibration at each target temperature is shown in FIG. 1.

Figure 2:
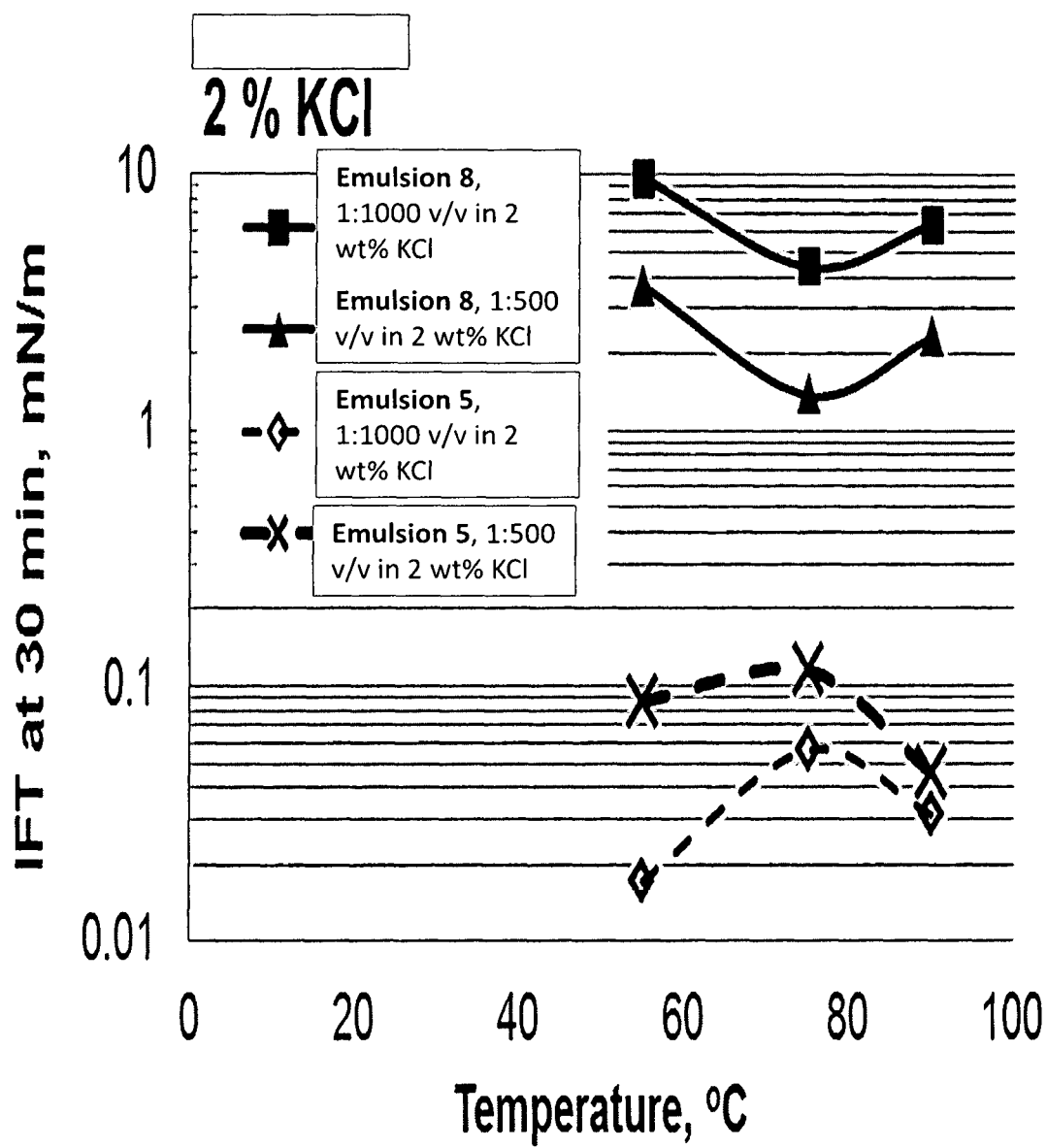
FIG. 2 is plot of interfacial tension as a function of temperature and concentration for fracturing fluids of the invention in 2 wt % KCl.

The test was repeated for Emulsions 5 and 8, wherein measurements were compared at 1:1000 vol:vol of the emulsion:2 wt % KCl and 1:500 emulsion:2 wt % KCl. A semi-log scale plot of interfacial tension (after 30 min equilibration at the target temperature) as a function of temperature is shown in FIG. 2.

Figure 3:
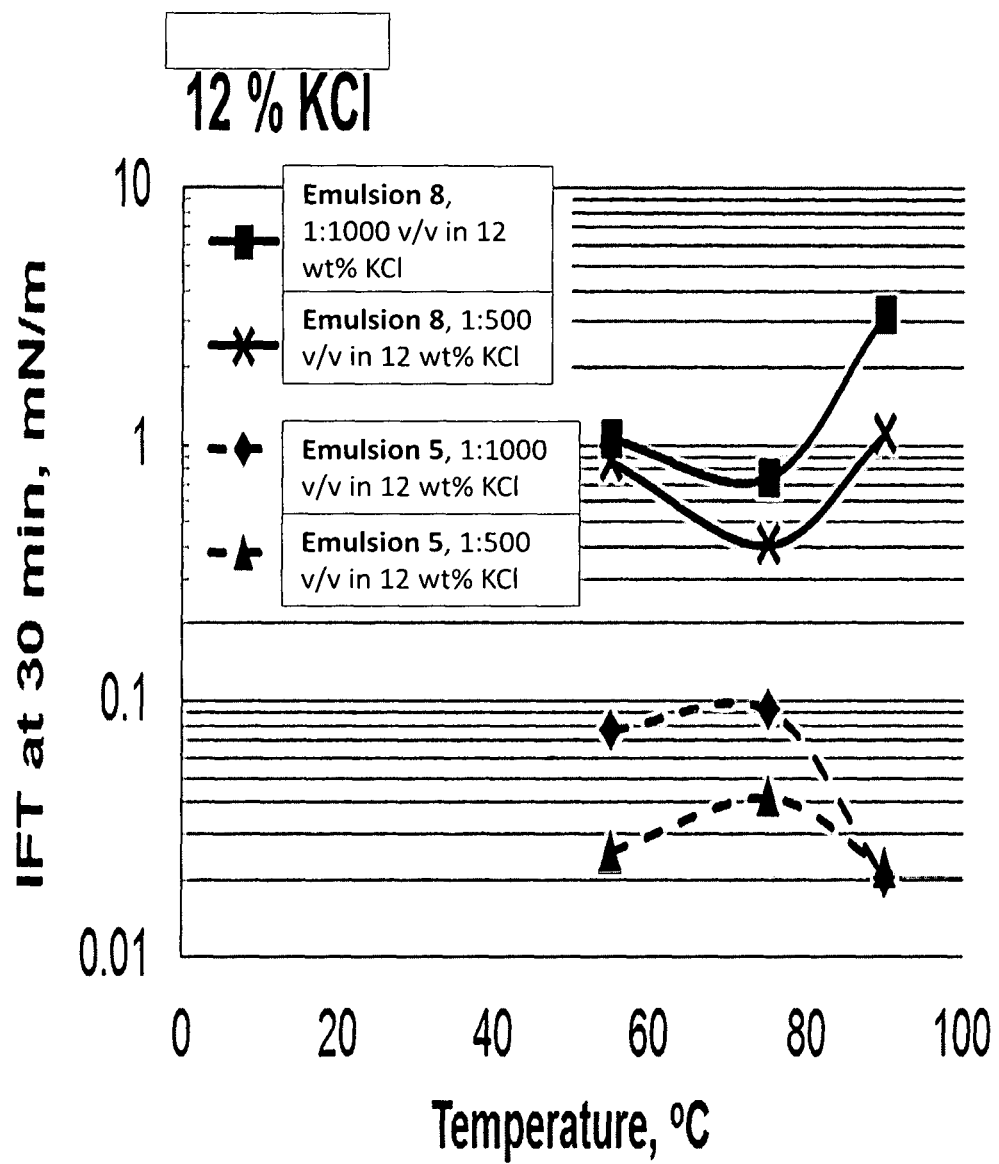
FIG. 3 is plot of interfacial tension as a function of temperature and concentration for fracturing fluids of the invention in 12 wt % KCl.

The test was repeated for Emulsions 5 and 8, wherein measurements were compared at 1:1000 vol:vol of the emulsion:12 wt % KCl and 1:500 emulsion:12 wt % KCl. A semi-log scale plot of interfacial tension (after 30 min equilibration at the target temperature) as a function of temperature is shown in FIG. 3.

Figure 4:
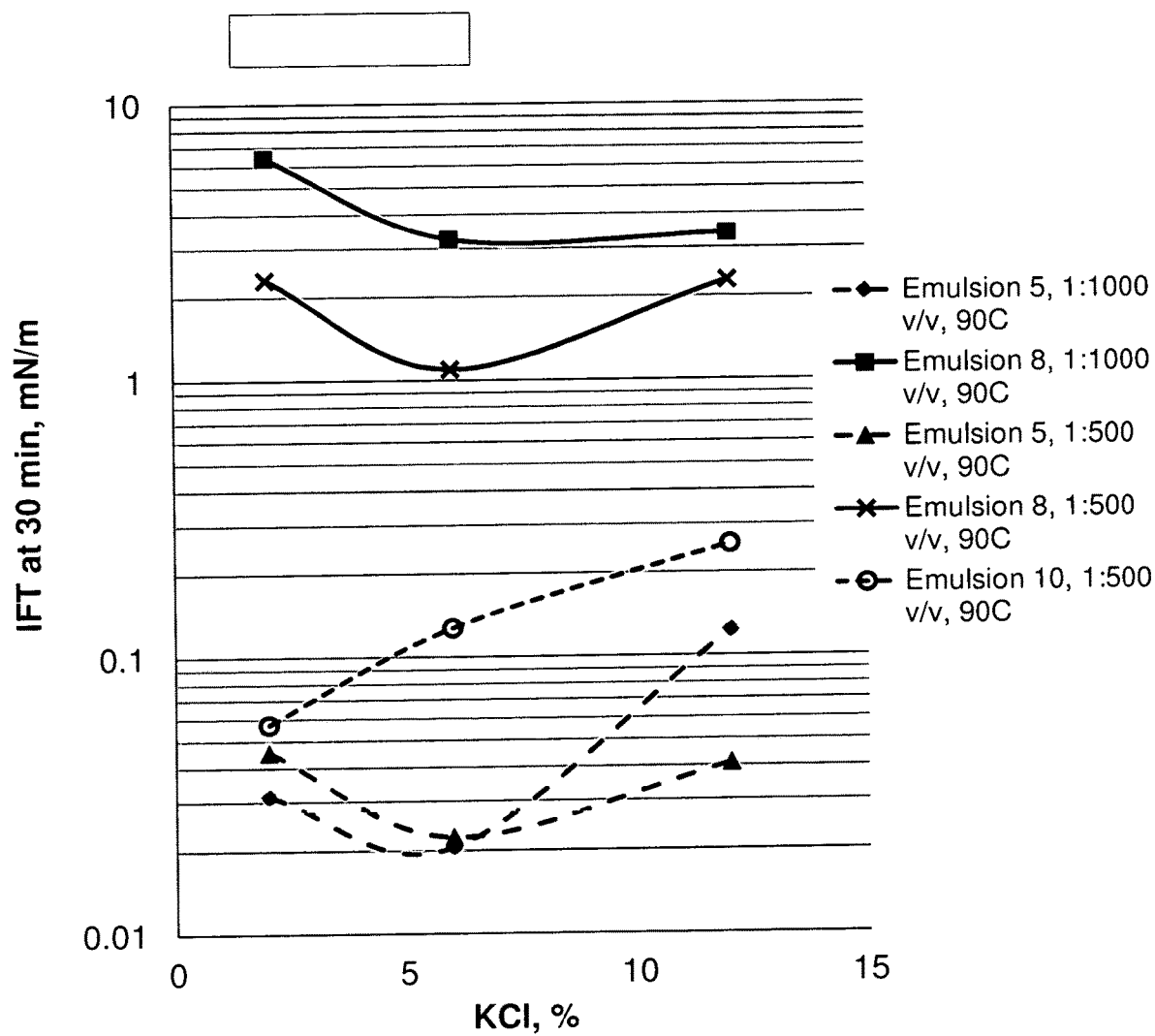
FIG. 4 is plot of interfacial tension as a function of KCl concentration for fracturing fluids of the invention.

The test was repeated for Emulsions 5 and 8 wherein the dilutions were 1:1000 emulsion:brine and for Emulsions 5, 8, and 10 wherein the dilutions were 1:500 emulsion:brine, wherein for all emulsions and dilutions the brine composition was varied between 2 wt % and 12 wt % KCl, and the entire test was conducted at 90° C. A semi-log scale plot of interfacial tension (after 30 min equilibration at 90° C.) as a function of KCl concentration is shown in FIG. 4.

Example 12

Gravitational drainage column testing was carried out on on fracturing fluids formed from Emulsions 5, 10, and C1. This test was designed to evaluate the sweeping efficiency and proppant clean-up performance of different fracturing fluids under gravitational flow conditions. The test employs crude oil or a condensate, brine (synthetic or formation), 100-mesh sand, and a fracturing fluid. Fracturing fluid samples were prepared by diluting an emulsion with a brine solution at a ratio of 1:1000 vol/vol or 1:500 vol/vol emulsion:brine. The column was pre-heated to the indicated temperature. The column pack was prepared by filling the column with about 16.5 mL of the fracturing fluid to be tested and slowly adding 60 grams of sand into the column. Then the column was compacted using vibration to minimize the presence of air pockets and compact the sand in the column. After compacting, the level of the fracturing fluid in the column was adjusted to extend to just above the sand pack. Then the column was allowed to stand undisturbed for 30 minutes or until the column reached the target temperature. Then two pore volumes of oil (~33 mL) were added into the column, a valve at the bottom of the column was open and a timer was started. Effluent flowing from the column was observed. The time when oil first appeared in the effluent was recorded as the time to breakthrough. The flow rate of oil after breakthrough was measured by recording the cumulative oil flowing out of the column after breakthrough and over about 30-60 min. Results are shown in Table 11.

TABLE 11

Gravitational drainage test results for fracturing fluids formed from Emulsions C1 and 5.

| Emulsion | Time to oil breakthrough, min. | Fracturing fluid eluted, vol % | Rate of oil flow after breakthrough, mL/min | Water saturation of sand, wt % |
|---|---|---|---|---|
| C1 | >300 | 15 | 0.012 | 85 |
| 5 | 6.88 | 65 | 0.5 | 35 |
| 10 | 5 | 88.6 | 1.3 | 11.4 |

Notably, Emulsions 5 and 10 provide substantially lower water saturation and substantially higher rate of oil flow compared to Emulsion C1. In the field, these results translate to more complete water cleanup (improved final water quality) and lower fracturing fluid saturation of the subterranean reservoir.

Example 13

Figure 5:
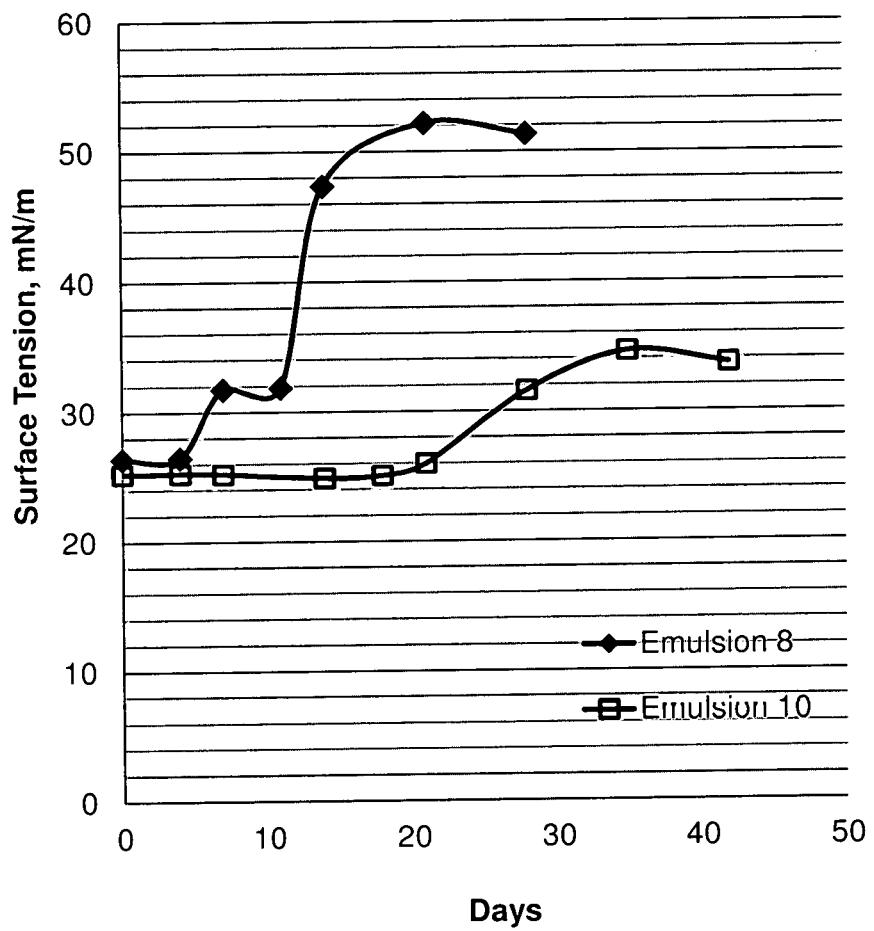
FIG. 5 is plot of surface tension as a function of time for fracturing fluids of the invention in 2% KCl at 300° F. (149° C.) at 200 psi (1379 kPa).

Thermal stability of Emulsions 8 and 10 was tested by measuring the surface tension of each emulsion in 2% aqueous KCl at 300° F. (149° C.) at 200 psi (1379 kPa) as a function of time. Each emulsion was prepared at 0.2% by weight of surfactant solids in the 2% aqueous KCl solution. The initial surface tension value of each prepared emulsion was measured by the Wilhemy plate method using a Krüss Force Tensiometer K100. Each prepared emulsion was then transferred into a a Teflon liner and each Teflon liner was placed inside an aging cell constructed of grade 316 stainless steel. Each aging cell was pressurized to 200 psi (1379 kPa) and then both cells were placed in an oven at 300° F. (149° C.). Samples of each prepared emulsion were taken out periodically (every 3-4 days) and the surface tension value of each prepared emulsion was measured by the Wilhemy plate method using a Krüss Force Tensiometer K100. The surface tension values were monitored until a significant increase in surface tension was observed (i.e. when surface tension changed from 27 mN/m to 60 mN/m). Plots of the surface tensions of the two prepared emulsions as a function of time are shown in FIG. 5 and the results are shown in Table 12.

TABLE 12

Surface tension measurements of prepared Emulsions 8 and 10.

| Prepared Emulsion | t, day | Surface Tension, mN/m |
|---|---|---|
| Emulsion 10 in 2% KCl | 0 | 25.23 |
|  | 4 | 25.26 |
|  | 7 | 25.22 |
|  | 14 | 24.89 |
|  | 18 | 25.07 |
|  | 21 | 25.98 |
|  | 28 | 31.56 |
|  | 35 | 34.58 |
|  | 42 | 33.66 |
| Emulsion 8 in 2% KCl | 0 | 26.39 |
|  | 4 | 26.49 |
|  | 7 | 31.73 |
|  | 11 | 31.85 |
|  | 14 | 47.35 |
|  | 21 | 52.17 |
|  | 28 | 51.34 |

Emulsion 10 shows improved thermal stability as judged by surface tension stability over time at 300° F. (149° C.) and 200 psi (1379 kPa) in 2% KCl. The surface tension of prepared Emulsion 8 rose from an initial value of 26.39 mN/m to 31.73 mN/m at 7 days, and at 14 days had risen to 47.35 mN/m, rising to over 50 mN/m after 21 days. In contrast, the surface tension of prepared Emulsion 10 did not rise over the first 14 days: from an initial value of 25.23 mN/m, the surface tension of prepared Emulsion 10 at 14 days was measured to be 24.89 mN/m, and had only rise to 25.98 mN/m at 21 days, 31.56 mN/m at 28 days, 34.58 mN/m at 35 days, and 33.66 mN/m after 42 days.

The invention illustratively disclosed herein can be suitably practiced in the absence of any element which is not specifically disclosed herein. While the invention is susceptible to various modifications and alternative forms, specifics thereof have been shown by way of examples, and are described in detail. It should be understood, however, that the invention is not limited to the particular embodiments described. On the contrary, the intention is to cover modifications, equivalents, and alternatives falling within the spirit and scope of the invention as described herein. In various embodiments, the invention suitably comprises, consists essentially of, or consists of the elements described herein and claimed according to the claims.

Additionally each and every embodiment of the invention, as described here, is intended to be used either alone or in combination with any other embodiment described herein as well as modifications, equivalents, and alternatives thereof.

What is claimed is:

1. A method of increasing recovery of crude oil from a subterranean hydrocarbon-containing formation, the method consisting essentially of:
   forming an emulsion, the emulsion consisting of
   (i) one or more coupling agents,
   (ii) one or more water soluble or dispersible nonionic surfactants having an HLB greater than about 10,
   (iii) one or more zwitterionic surfactants,
   (iv) one or more anionic surfactants, and
   (v) water;
   optionally combining the emulsion with one or more oil field additives selected from the group consisting of viscosifying agents, solvents, alkali, non-emulsifiers, corrosion inhibitors, biocides, friction reducers, emulsion breakers, and proppants;
   contacting the emulsion with a high total dissolved solids water source comprising at least about 4 wt % non-polymeric solids dissolved therein to form a fracturing fluid, the fracturing fluid comprising about 98 wt % to 99.99 wt % of the high total dissolved solids water source;
   injecting the fracturing fluid into a subterranean hydrocarbon-containing formation; and
   collecting a hydrocarbon from the subterranean hydrocarbon-containing formation.

2. The method of claim 1 wherein at least a portion of the subterranean hydrocarbon containing formation is at a temperature of about 60° C. to 120° C.

3. The method of claim 1 wherein the water source comprises about 5 wt % to 30 wt % total dissolved solids.

4. The method of claim 1 wherein the contacting is carried out contemporaneously with the injecting.

5. The method of claim 1 wherein the contacting is carried out prior to the injecting.

6. The method of claim 1 wherein the injecting is into a first wellbore connected to the subterranean hydrocarbon-containing formation, and the collecting is from a second wellbore that is connected to the subterranean hydrocarbon-containing formation.

7. The method of claim 1 wherein the injecting is into a wellbore connected to the subterranean hydrocarbon-containing formation, and the collecting is from the same wellbore.

* * * * *